United States Patent
Nakanishi et al.

(10) Patent No.: US 10,434,617 B2
(45) Date of Patent: Oct. 8, 2019

(54) METHOD OF PRODUCING DISPLAY PANELS

(71) Applicants: Sharp Kabushiki Kaisha, Sakai, Osaka (JP); Denka Company Limited, Chuo-ku, Tokyo (JP)

(72) Inventors: Youhei Nakanishi, Sakai (JP); Masayuki Kanehiro, Sakai (JP); Hiroyuki Kurimura, Shibukawa (JP); Yasunori Ishida, Shibukawa (JP); Takuya Amada, Shinagawa-ku (JP); Koji Hashimoto, Shinagawa-ku (JP)

(73) Assignees: SHARP KABUSHIKI KAISHA, Sakai (JP); DENKA COMPANY LIMITED, Tokyo (JP)

( * ) Notice: Subject to any disclaimer, the term of this patent is extended or adjusted under 35 U.S.C. 154(b) by 104 days.

(21) Appl. No.: 15/577,036

(22) PCT Filed: May 20, 2016

(86) PCT No.: PCT/JP2016/064976
§ 371 (c)(1),
(2) Date: Nov. 27, 2017

(87) PCT Pub. No.: WO2016/190230
PCT Pub. Date: Dec. 1, 2016

(65) Prior Publication Data
US 2018/0141181 A1    May 24, 2018

(30) Foreign Application Priority Data
May 27, 2015   (JP) ................................ 2015-107599

(51) Int. Cl.
*B24B 5/04*  (2006.01)
*G02F 1/13*  (2006.01)
(Continued)

(52) U.S. Cl.
CPC ............... *B24B 5/042* (2013.01); *B24B 9/14* (2013.01); *B24B 13/015* (2013.01); *G02F 1/13* (2013.01);
(Continued)

(58) Field of Classification Search
CPC ......... B24B 5/042; B24B 9/14; B24B 13/015; G02F 1/13; G02F 1/133351; G02F 1/1339; G02F 2201/56; G02F 2202/023
(Continued)

(56) References Cited

U.S. PATENT DOCUMENTS 5,110,630 A * 5/1992 Abe ...................... B05D 7/16
                                                   148/264
5,160,560 A * 11/1992 Welkowsky .......... H01L 21/302
                                                   148/DIG. 12
(Continued)

FOREIGN PATENT DOCUMENTS

JP     2006-293045 A    10/2006
JP     2008-110457 A    5/2008
(Continued)

OTHER PUBLICATIONS

Official Communication issued in International Patent Application No. PCT/JP2016/064976, dated Aug. 2, 2016.

*Primary Examiner* — George B Nguyen
(74) *Attorney, Agent, or Firm* — Keating & Bennett, LLP

(57) ABSTRACT

A method of collectively producing display panels each having an outline a part of which is curved includes a bonded substrate forming process of bonding substrates in a pair one of which has thin film patterns and forming a bonded substrate 50, a layering process of layering multiple bonded substrates 50 via curing resin 60 and curing the curing resin 60, a grinding process of collectively grinding the substrates in a pair and the curing resin 60 that are (Continued)

outside the thin film pattern on each of the bonded substrates 50B that are layered on each other along the outline and collectively forming edge surfaces of the display panels each having the curved outline, and a separation process of separating each of the bonded substrates 50B that are layered on each other from the curing resin 60.

9 Claims, 15 Drawing Sheets

(51) Int. Cl.
*B24B 9/14* (2006.01)
*B24B 13/015* (2006.01)
*G02F 1/1333* (2006.01)
*G02F 1/1339* (2006.01)

(52) U.S. Cl.
CPC ...... *G02F 1/1339* (2013.01); *G02F 1/133351* (2013.01); *G02F 2201/56* (2013.01); *G02F 2202/023* (2013.01)

(58) Field of Classification Search
USPC ...................................... 451/44, 67
See application file for complete search history.

(56) References Cited

U.S. PATENT DOCUMENTS

| | | | | |
|---|---|---|---|---|
| 5,170,595 | A | * | 12/1992 | Wiand ................ B24D 9/085 15/230 |
| 5,868,603 | A | * | 2/1999 | Allaire ................ B24B 9/10 451/29 |
| 6,627,025 | B1 | * | 9/2003 | Yu ..................... D01D 5/32 156/167 |
| 7,210,983 | B1 | * | 5/2007 | Chien ................ B24B 5/042 451/178 |
| 7,959,492 | B2 | | 6/2011 | Haneda et al. |
| 2006/0089086 | A1 | * | 4/2006 | Pedersen ............ B24B 9/002 451/8 |
| 2008/0145671 | A1 | * | 6/2008 | Burghardt ........... B32B 7/12 428/424.8 |
| 2008/0154016 | A1 | * | 6/2008 | Burghardt ........... B32B 7/12 528/363 |
| 2008/0176489 | A1 | | 7/2008 | Haneda et al. |
| 2018/0356670 | A1 | * | 12/2018 | Kanehiro .......... G02F 1/133308 |

FOREIGN PATENT DOCUMENTS

| | | |
|---|---|---|
| JP | 2009-116214 A | 5/2009 |
| JP | 2009-256125 A | 11/2009 |
| JP | 2015-091610 A | 5/2015 |
| WO | 2013/084953 A1 | 6/2013 |
| WO | 2014/192941 A1 | 12/2014 |

* cited by examiner

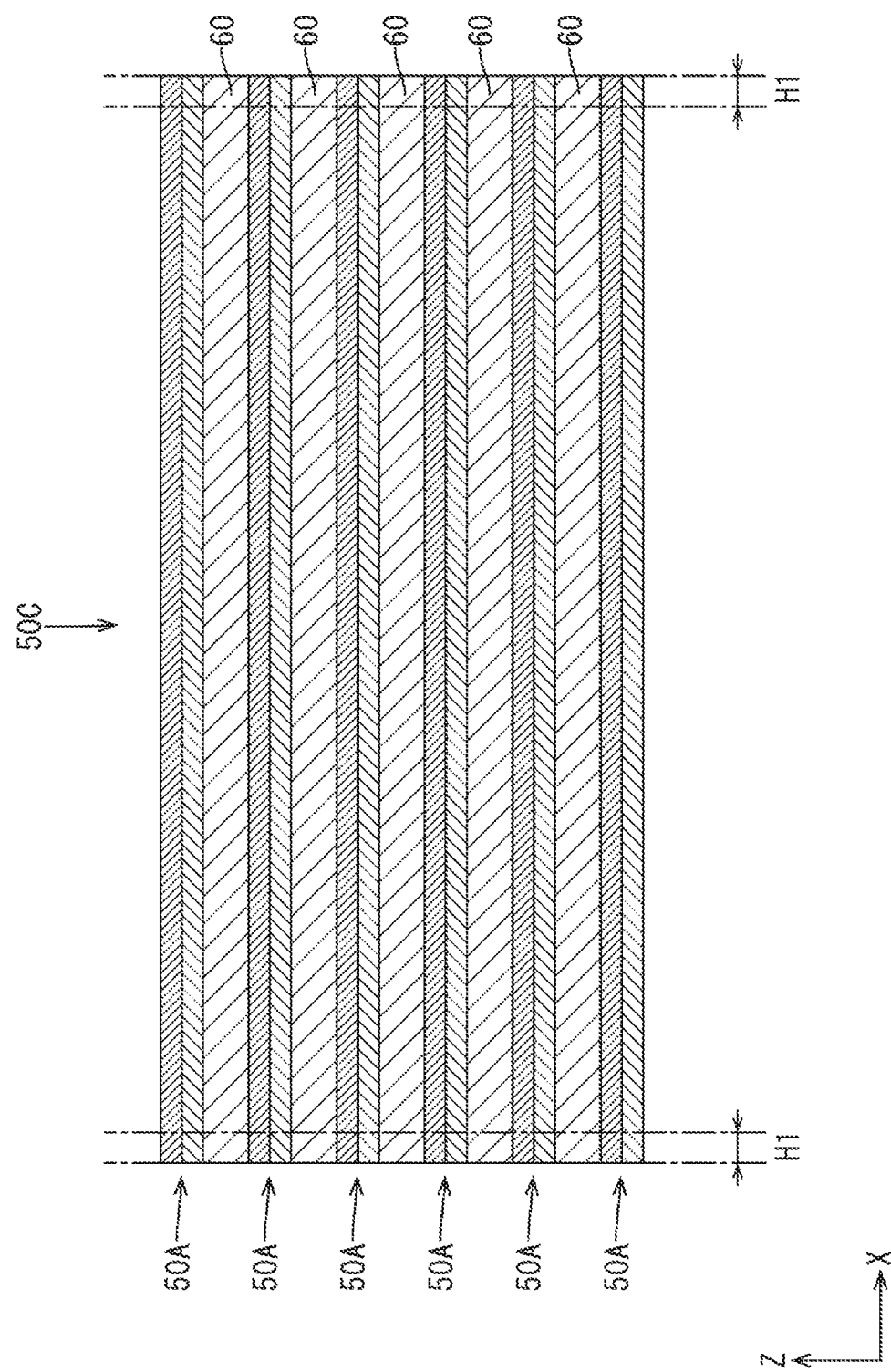

METHOD OF PRODUCING DISPLAY PANELS

TECHNICAL FIELD

The present technology relates to a method of producing display panels.

BACKGROUND ART

A method of producing a display panel such as a liquid crystal panel included in a display device as described below has been known. A pair of substrates one of which includes a thin film pattern of semiconductor elements such as thin film transistors (TFTs) are bonded to each other and a bonded substrate is formed. The bonded substrate is cut along an outline of the display panel and a display panel is produced.

A display panel produced with the above producing method generally has a front view of a square outline or a rectangular outline. Recently, according to variety of usage of the display panels, display panels having a non-rectangular outline such as an outline a part of which is curved have been produced. For example, Patent Document 1 discloses a method of producing a liquid crystal panel including a substantially ellipsoidal display area and, that is, a non-rectangular outline shape.

The substrate used for a display panel such as a liquid crystal panel is generally a plate-shaped glass substrate. For example, Patent Document 2 discloses a method of processing a great number of glass substrate plates with high production efficiency. Specifically, with the processing method, a great number of glass substrate plates are layered on each other and the great number of glass substrate plates are bonded to each other via a releasable bonding member that is disposed between the glass substrate plates to form a glass substrate block. Next, the glass substrate block is divided with respect to a surface direction into divided glass substrate blocks each having a small area. Next, at least outer periphery of each divided glass substrate block is processed to form a product glass block having a plan view product shape. Next, after the product glass block is subjected to an edge surface process, the product glass block is separated into respective plates. With such a processing method, the great number of glass substrate plates that are layered on each other are subjected to a dividing process, outer shape processing, and the edge surface process. Therefore, a great number of glass plate products can be produced with a small number of steps and productivity is enhanced.

In the processing method described in Patent Document 2, photo-curable liquid bonding material that is cured by irradiation of ultraviolet rays and softened from the cured state by increasing temperature is used as the bonding member disposed between the glass substrates.

RELATED ART DOCUMENT

Patent Document

Patent Document 1: Japanese Unexamined Patent Application Publication No. 2006-293045
Patent Document 2: Japanese Unexamined Patent Application Publication No. 2009-256125

Problem to be Solved by the Invention

However, in the method of producing liquid crystal panels described in Patent Document 1, a mother substrate including multiple panel regions for the liquid crystal panels is cut into multiple pieces for each of the panel regions and each panel piece is subjected to processing of an edge surface thereof that forms a part of the outline of the liquid crystal panel. Thus, the liquid crystal panels having non-rectangular outlines are produced. Therefore, if the mother substrate includes a large number of panel regions, it takes long time to finish the processing of the edge surfaces of all of the panel regions and a process of producing the liquid crystal panels may be long.

Further, in the method of producing the liquid crystal panels described in Patent Document 1, the edge surface of each panel area that forms the outline of the liquid crystal panel is processed with a scribing method. Therefore, if the liquid crystal panel to be produced has a curved outline and the edge surface having a complicated outline shape is to be processed, cracks are likely to be produced on the edge surface to be processed due to a stress caused by the scribing. It is difficult to produce the liquid crystal panels having a complicated outline with high precision.

With the method of processing the glass plates described in Patent Document 2, twenty glass substrate plates are layered on each other while having photocurable liquid bonding material between the glass substrate plates. Then, ultraviolet rays (UV light) are irradiated on an upper surface of the layered glass substrate plates to cure the bonding material. Thus, a glass substrate plate block including the glass substrate plates that are integrally bonded to each other is formed. However, with such a producing sequence, layering of the plates of 10 to 30 μm thickness with high precision is difficult. Further, if the method of producing liquid crystal panels is performed with the above producing sequence, ultraviolet rays hardly transmit through the color filter and the black matrix formed on the glass substrate and therefore, the bonding material included in the layered glass substrate plates is not cured by ultraviolet rays. Further, if the liquid crystal panels are irradiated with ultraviolet rays of high intensity for a long time, the resin layer, the alignment films, and the liquid crystals included in the liquid crystal panel are adversely affected by the ultraviolet rays and display errors may be caused. The process of irradiation of ultraviolet rays and curing of the bonding material is not suitable for the production of liquid crystal panels.

DISCLOSURE OF THE PRESENT INVENTION

The present technology was made in view of the above circumstances. An object is to produce collectively display panels each having a curved outline with high precision while shortening a production process.

Means for Solving the Problem

The technology described in this specification is related to a method of collectively producing display panels each having an outline a part of which is curved, and the method includes a bonded substrate forming process of bonding substrates in a pair one of which has thin film patterns and forming a bonded substrate, a layering process of layering multiple bonded substrates via curing resin and curing the curing resin after the bonded substrate forming process, the curing resin containing (A) a polyfunctional (meth)acrylate oligomer/polymer and/or a polyfunctional (meth)acrylate monomer, (B) aromatic mono(meth)acrylate not having a hydroxyl group, a carboxyl group, and an epoxy group and/or alicyclic mono(meth)acrylate not having a hydroxyl group, a carboxyl group, and an epoxy group, (C) a radical photopolymerization initiator, (D) radical thermal polymerization initiator, (E) a polymerization accelerator, and (F) thermally expandable microcapsules, as a first agent containing at least the radical photopolymerization initiator and a second agent containing at least the radical thermal polymerization initiator, a grinding process of collectively grinding the substrates in a pair and the curing resin that are outside the thin film pattern on each of the bonded substrates that are layered on each other along the outline and collectively forming edge surfaces of the display panels each having the curved outline, the grinding process being performed after the layering process, and a separation process of separating each of the bonded substrates that are layered on each other from the curing resin after the grinding process.

According to the above producing method, in the layering process, the bonded substrates each having thin film patterns on inner surfaces thereof are layered with each other via the curing resin and the curing resin is cured such that the bonded substrates that are layered on each other are fixed via the curing resin. In the grinding process, in the bonded substrates that are layered on each other, the substrates and the curing resin that are outside the respective thin film patterns are collectively ground along the outline of the display panel to be produced. Thus, the curved edge surfaces of the display panels having curved outlines are collectively formed. As a result, the process of producing the display panels is shortened compared to the method of processing the bonded substrates one by one to form each of the edges of the display panels.

The bonded substrates that are layered on each other and fixed to each other have rigidity greater than one bonded substrate. Therefore, cracks are less likely to be produced on the edge surfaces of the display panels to be produced when the layered bonded substrates are collectively ground. Further, the curved edge surfaces of the display panels having the curved outlines are formed by collectively grinding the layered bonded substrates. Therefore, the outline of each of the display panels to be produced can be formed with high precision. According to the producing method, the display panels having the curved outlines are collectively produced with high precision while shortening the production process.

The curing resin in this specification preferably contains (A) a polyfunctional (meth)acrylate oligomer/polymer and/or a polyfunctional (meth)acrylate monomer, (B) aromatic mono(meth)acrylate not having a hydroxyl group, a carboxyl group, and an epoxy group and/or alicyclic mono (meth)acrylate not having a hydroxyl group, a carboxyl group, and an epoxy group, (C) a radical photopolymerization initiator, (D) a radical thermal polymerization initiator, (E) a polymerization accelerator, and (F) thermally expandable microcapsules. The curing resin preferably contains the above components as a first agent containing at least the radical photopolymerization initiator and a second agent containing at least the radical thermal polymerization initiator.

Examples of the polyfunctional (meth)acrylate oligomer/polymer and/or the polyfunctional (meth)acrylate monomer are as follows. Examples of the polyfunctional (meth)acrylate oligomer/polymer may include 1,2-polybutadiene terminated urethane(meth)acrylate and a hydrogenated product thereof, 1,4-polybutadiene terminate urethane (meth)acrylate, polyisoprene terminated (meth)acrylate, polyester-based urethane (meth)acrylate, polyether based urethane (meth)acrylate, and bis-A type epoxy (meth)acrylate. Examples of the polyfunctional (meth)acrylate monomer may include bifunctional (meth)acrylate monomer, trifunctional (meth)acrylate monomer, pentaerythritol tetra (meth)acrylate, and dipentaerythritol hexa(meth) acrylate or the like. Examples of the bifunctional (meth)acrylate monomer may include 1,6-hexanediol di(meth)acrylate, 1,9-nonanediol di(meth)acrylate, neopentylglycol di(meth)acrylate, dicyclopentanyl di(meth)acrylate, polypropylene glycol di(meth)acrylate, and the like. Examples of the trifunctional (meth)acrylate monomer may include trimethylolpropane tri(meth)acrylate, tris [(meth)acryloxyethyl] isocyanurate, and the like.

The content of the polyfunctional (meth)acrylate oligonomer/polymer and/or the polyfunctional (meth)acrylate monomer is preferably from 5 mass % to 30 mass % of the curing resin from a viewpoint of the curing properties, processability, and releasing properties.

Examples of the aromatic mono(meth)acrylate (monofunctional (meth)acrylate having an aromatic ring) not having a hydroxyl group, carboxyl group, and an epoxy group may include benzyl (meth)acrylate, phenoxyethyl (meth) acrylate, phenol ethylene oxide-modified (meth)acrylate, phenol 2 mol (ethylene oxide-modified) (meth)acrylate, phenol 4 mol (ethylene oxide-modified) (meth)acrylate, p-noylphenyl ethylene oxide-modified (meth)acrylate, p-cumylpnenyl ethylene oxide-modified (meth)acrylate, and the like. Examples of the alicyclic mono(meth) acrylate (monofunctional (meth)acrylate having an alicyclic structure) not having a hydroxyl group, a carboxyl group and an epoxy group may include isobornyl (meth)acrylate, dicyclopentanyl (meth)acrylate, dicyclopentenyloxyethyl (meth) acrylate, dicyclopentenyl (meth)acrylate, cyclohexyl (meth) acrylate, and the like. The content of the aromatic mono (meth)acrylate not having a hydroxyl group, a carboxyl group, and an epoxy group and/or the alicyclic mono(meth) acrylate not having a hydroxyl group, a carboxyl group and an epoxy group is preferably 50 mass % to 90 mass % of the curing resin. If the content thereof is greater than 90 mass %, the bonding properties may not be obtained and if the content thereof is less than 50 mass %, the releasing properties are lowered.

Polymerization initiators that generate radicals upon light irradiation are used as the radical photopolymerization initiator. The content of the radical photopolymerization initiator is preferably from 0.1 mass % to 10 mass % of the curing resin. If the content is less than 0.1 mass %, the curing properties are lowered and if the content is greater than 10 mass %, the curing resin after curing remains soft and has low processability. Polymerization initiators that generate radicals upon heat application are used as the radical thermal polymerization initiator. The content of the radical thermal polymerization initiator is preferably from 0.1 mass % to 10 mass % of the curing resin. If the content is less than 0.1 mass %, the curing properties are lowered and if the content is greater than 10 mass %, the curing resin after curing remains soft and has low processability. The polymerization accelerator in this specification reacts with the radical thermal polymerization initiator to generate radicals and accelerate the polymerization. The content of the polymerization accelerator is preferably from 0.1 mass % to 10 mass % of the curing resin. The thermally expandable microcapsules in this specification are microbeads consisted of low boiling liquid hydrocarbon which is encapsulated inside a high polymer shell. The content of the thermally expandable microcapsules is preferably from 3 mass % to 15 mass % of the curing resin.

The curing resin in this specification is the two-part liquid resin that includes the first agent containing at least the radical thermal polymerization initiator and the second agent containing at least the polymerization accelerator. The curing resin is used as an adhesive composition for provisional bonding. All the required components of the curing resin for the two-part liquid resin in this specification are not mixed while being stored, and the components of the curing resin is preferably stored separately in a form of the first agent and the second agent.

In the above method of producing the display panels, in the layering process, the curing resin may be disposed only a portion near a portion of the bonded substrate overlapping the outline in a plan view.

According to such a producing method, the amount of the curing resin used in the layering process can be greatly reduced compared to the amount of the curing resin disposed on a most part of each bonded substrate to layer the bonded substrates in the layering process. As a result, a cost for the curing resin is reduced. Further, due to the decrease in the amount of the curing resin used in the layering process, each of the layered bonded substrates can be easily separated from the curing resin in the separation process.

In the above method of producing the display panels, in the layering process, the curing resin may include multiple types of resin that are cured by mixing.

According to such a producing method, in the layering process, the curing resin can be cured without applying excessive amount of light or heat to the thin film patterns formed on the bonded substrates. Accordingly, in each of the display panels to be produced, display errors are less likely to be caused due to the application of excessive amount of light or heat to the thin film patterns.

In the above method of producing the display panels, in the layering process, every time another bonded substrate is layered on the bonded substrate with using the curing resin having photo curing properties, light may be spotlighted to portions of the bonded substrates that are layered on each other and the portions are outside each of the thin film patterns in a plan view and the curing resin in the portions is cured.

According to such a producing method, in the layering process, the curing resin that is outside the thin film patterns on a portion of the bonded substrates in a plan view is cured such that the bonded substrates that are layered on each other before the whole curing resin is cured are not displaced from each other.

In the above method of producing the display panels, in the layering process, dummy substrates in a pair having plate surfaces greater than that of the bonded substrate may be prepared and after the bonded substrates are layered on each other, the bonded substrates that are layered may be sandwiched by the dummy substrates in a pair via the curing resin.

According to such a producing method, in the grinding process, a rotational grinding wheel used for grinding is in contact with the curing resin and the dummy substrates sandwiching the layered substrate therebetween. Therefore, in the grinding process, the stress due to the grinding is less likely to be concentrated on the uppermost one and the lowermost one of the bonded substrates included in the layered substrate, and chipping is less likely to be caused in the two bonded substrates.

In the above method of producing the display panels, in the layering process, the curing resin containing spacers each having a spherical shape and thermally expandable microcapsules that are expandable greater than a diameter of the spacers may be used, and in the separation process, heat may be applied to the curing resin to expand the microcapsules.

According to such a producing method, in the layering process, the clearance between the adjacent layered bonded substrates is kept constant by the spacers and the bonded substrates are layered on each other with high precision. In the separation process, the microcapsules are expanded greater than the spacers by the application of heat to the curing resin. Therefore, each of the layered bonded substrates is easily separated from the curing resin.

In the above method of producing the display panels, in the layering process, the microcapsules that are expandable at a temperature of 100° C. or lower may be used, and in the separation process, the bonded substrates that are layered may be immersed in boiling water.

According to such a producing method, if the layered substrate is immersed in the boiling water such that the boiling water flows into a space between the adjacent layered bonded substrate due to surface tension of water and the microcapsules contained in the curing resin included in the ground layered substrate are expanded. Each of the bonded substrates can be separated from the curing resin. Each of the layered bonded substrates can be separated from the curing resin without heating at a temperature higher than 100° C. Therefore, the display errors are less likely to be generated on each display panel to be produced due to the excessive heating of the thin film patterns.

In the above method of producing the display panels, in the layering process, the curing resin may be disposed on only a part of a plate surface of the bonded substrate and a sheet member having a certain thickness may be disposed on another part of the plate surface.

According to such a producing method, a space is formed between the adjacent layered bonded substrates by the curing resin and the sheet member. Therefore, in the separation process, the boiling water is likely to flow into the space between the adjacent layered bonded substrates when the layered bonded substrates are immersed in the boiling water. Accordingly, each of the bonded substrates can be separated from the curing resin more easily.

The above method of producing the display panels may further include an etching process of removing a part of edge surfaces of the bonded substrates that are layered with etching after the grinding process and before the separation process.

According to such a producing method, in the etching process, a part of the edge surfaces of the bonded substrates is removed and accordingly, microcracks that may be produced on the edge surfaces are removed together with the edge surfaces. Therefore, cracks due to the microcracks are less likely to be produced in each of the display panels to be produced and the display panel to be produced has greater strength.

Advantageous Effect of the Invention

According to the technology described in this specification, a process of collectively producing display panels each having a curved outline with high precision while shortening a production process.

BRIEF DESCRIPTION OF THE DRAWINGS

FIG. 17 is a side view illustrating an etching process according to a third embodiment.

MODES FOR CARRYING OUT THE INVENTION

First Embodiment

Figure 1:
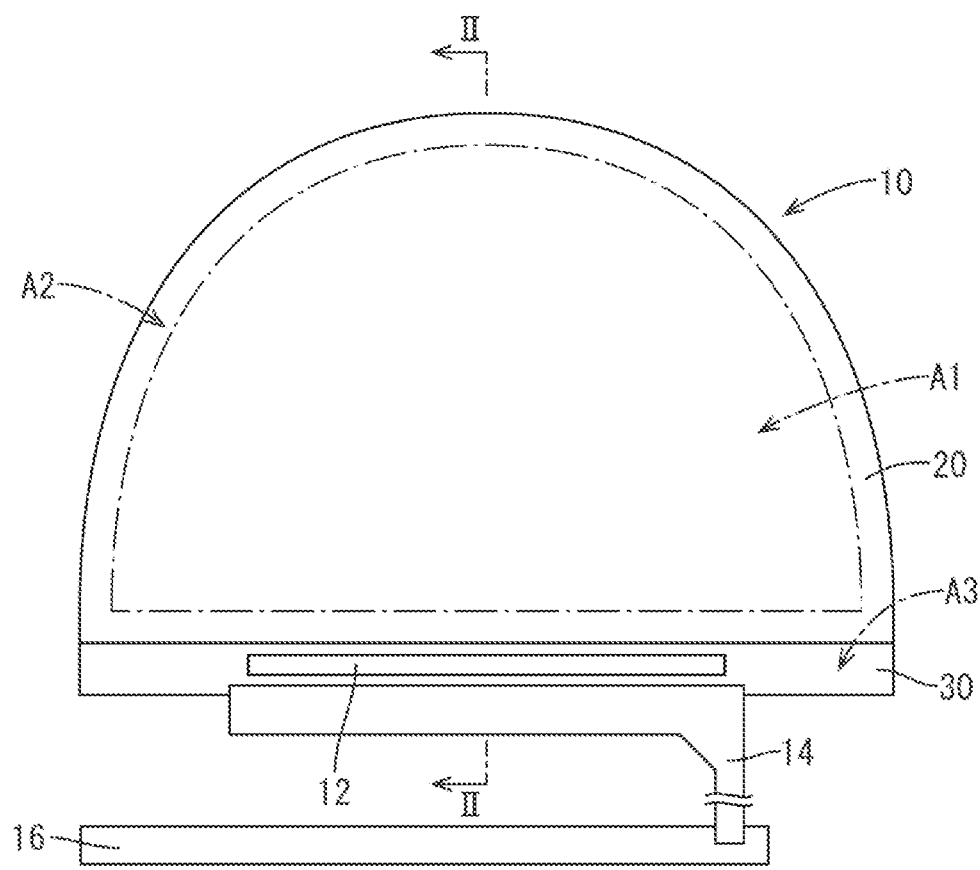
FIG. 1 is a schematic plan view of a liquid crystal panel according to a first embodiment.

A first embodiment will be described with reference to FIGS. 1 to 11. In the present embodiment, a method of producing a liquid crystal panel (an example of a display panel) 10 included in a liquid crystal display device will be described. X-axis, Y-axis and Z-axis may be indicated in the drawings and the axes in each drawing correspond to the respective axes in other drawings. An upper side in FIG. 2 and FIGS. 4 to 11 corresponds to an upper side (a front side) of the liquid crystal panel 10. A configuration of the liquid crystal panel 10 will be described. The liquid crystal panel 10 of the present embodiment does not have a general outline plan view shape such as a rectangular shape or a square shape but has an outline a part of which is curved and has a non-rectangular overall shape. Specifically, as illustrated in FIG. 1, the plan view outline shape of the liquid crystal panel 10 is a substantially semi-circular shape. In FIG. 1, the liquid crystal panel 10 has a straight outline of the whole outline shape and the straight outline extends in the X-axis direction.

The liquid crystal panel 10 includes a laterally elongated display area A1 in most area thereof and images appear on the display area A1. An area of the liquid crystal panel 10 outside the display area A1 is a non-display area A2 in which images are not displayed. The non-display area A2 includes a frame portion surrounding the display area A1 that is a frame portion of the liquid crystal panel 10. The non-display area A2 includes a mounting area A3 in which an IC chip (an example of a driving component) 12 and a flexible printed circuit board 14 are mounted. The mounting area A3 is locally close to one edge portion of the liquid crystal panel 10 with respect to the Y-axis direction (on a lower side in FIG. 1). The IC chip 12 is an electronic component that drives the liquid crystal panel 10 and a control board 16 that supplies various input signals from the outside to the IC chip 12 is connected to the liquid crystal panel 10 via the flexible circuit board 14. As illustrated in FIG. 1, the mounting area A3 is a laterally elongated rectangular area having a laterally elongated rectangular outline. The outline shape has long sides extending linearly along the X-axis and short sides extending linearly along the Y-axis in FIG. 1.

Figure 2:
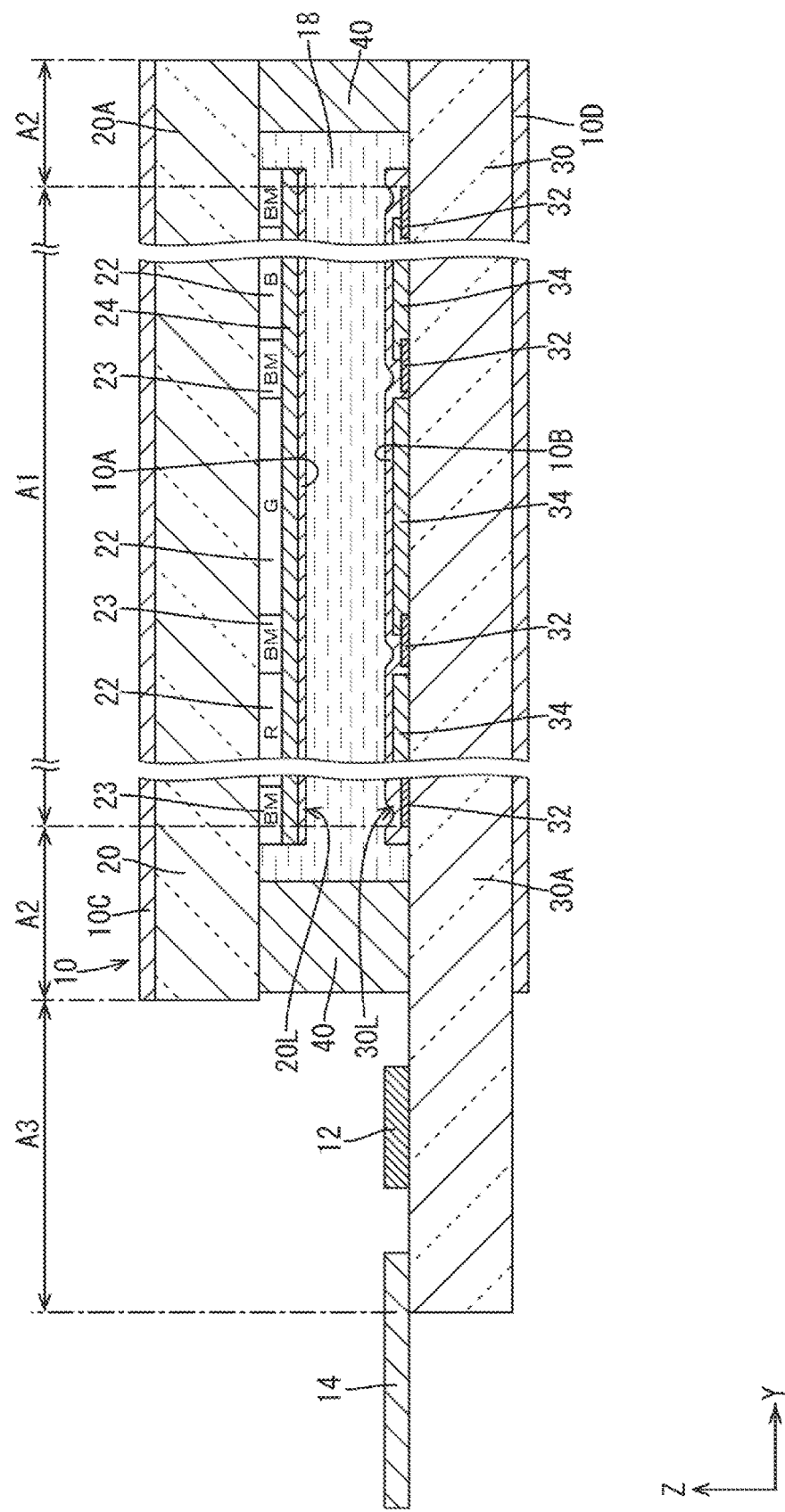
FIG. 2 is a schematic cross-sectional view of the liquid crystal panel illustrating a cross-sectional configuration taken along line II-II in FIG. 1.

As illustrated in FIGS. 1 and 2, the liquid crystal panel 10 includes a pair of glass substrates 20 and 30 having high transmissivity, and a liquid crystal layer 18 including liquid crystal molecules having optical characteristics that vary according to application of electric field. The substrates 20 and 30 are bonded together with an ultraviolet cure sealing agent portion 40 with a cell gap of a thickness of the liquid crystal layer 18 therebetween. The substrates 20 and 30 include a color filter substrate 20 on the front (on a front surface side) and an array substrate 30 on a back side (on a rear surface side). Alignment films 10A and 10B are formed on inner surfaces of the substrates 20 and 30, respectively, for aligning the liquid crystal molecules included in the liquid crystal layer 18. Polarizing plates 10C and 10D are bonded to an outer surface of a first glass substrate (one example of substrates) of the color filter substrate 20 and an outer surface of a second glass substrate (one example of the substrates) of the array substrate 30.

The array substrate 30 and the polarizing plate 10C are bonded to a main portion of the first glass substrate 20A of the color filter substrate 20. As illustrated in FIG. 1, the color filter substrate 20 has an X-axis dimension substantially same as that of the array substrate 30 and has a Y-axis dimension smaller than that of the array substrate 30. The color filter substrate 20 and the array substrate 30 are bonded together such that one of the Y-axis edges (upper-side edges in FIG. 1, on an edge having an arched curved outline) thereof are aligned with each other. According to such a configuration, the color filter substrate 20 is not overlapped with a portion of the array substrate 30 in another one of the Y-axis edges (a lower-side edge in FIG. 1) over a certain area and the edge portion of the array substrate 30 is exposed outside on the front and rear plate surfaces thereof. Thus, the exposed portion is a mounting area A3 where the IC chip 12 and the flexible printed circuit board 14 are mounted.

The color filter substrate 20 and the polarizing plate 10D are bonded to a main portion of the second glass substrate 30A of the array substrate 30 and a portion of the array substrate 30 for the mounting area A3 where the IC chip 12 and the flexible printed circuit board 14 are mounted is not overlapped with the color filter substrate 20 and the polarizing plate 10D. The sealing agent portion 40 for bonding the substrates 20 and 30 of the liquid crystal panel 10 is disposed within the non-display area A2 of an overlapped portion where the substrates 20 and 30 are overlapped with each other. The sealing agent portion 40 is disposed to surround the display area A1 along the outline of the color filter substrate 20 (be in a substantially semicircular plan view form) (see FIG. 2).

Layered thin film patterns are formed on the inner surface side (the liquid crystal layer 18 side) of the second glass substrate 30A of the array substrate 30. Specifically, the thin film patterns of TFTs 32 that are switching components and thin film patterns of pixel electrodes 34 that are transparent conductive films such as indium tin oxide (ITO) and connected to the TFTs 32 are arranged in a matrix on the inner surface of the second glass substrate 30A of the array substrate 30. Furthermore, gate lines, source lines and capacitance lines (not illustrated) are arranged to surround the TFTs 32 and the pixel electrodes 34 on the array substrate 30. Terminals extended from each of the gate lines and the capacitance lines and terminals extended from the source lines are connected to the edge portion of the array substrate 30. Signals or reference potential is input from a control board 16 illustrated in FIG. 1 to each of the terminals and driving of the TFTs 32 is controlled.

As illustrated in FIG. 2, color filters 22 are arranged on the inner surface side (the liquid crystal layer 18 side) of the first glass substrate 20A of the color filter substrate 20. The color filters 22 are arranged in a matrix while overlapping the respective pixel electrodes 34 of the array substrate 30 in a plan view. The color filters 22 include red (R), green (G), and blue (B) color portions. A light blocking portion (black matrix) 23 is formed between the color portions included in the color filters 22 for reducing color mixture. The light blocking portion 23 is arranged to overlap the gate line, the source lines, and the capacitance lines in a plan view. In the liquid crystal panel 10, the R (red) color portion, the G (green) color portion, the B (blue) color portion, and three pixel electrodes 34 opposed to the respective color portions form a display pixel that is a display unit. Each display pixel includes a red pixel including the R color portion, a green pixel including the G color portion, and a blue pixel including the B color portion. The color pixels are repeatedly arranged along a row direction (the X-axis direction) on a plate surface of the liquid crystal panel 10 to form a pixel group. The pixel groups are arranged along the column direction (the Y-axis direction).

As illustrated n FIG. 2, a counter electrode 24 is disposed on inner surfaces of the color filter 22 and the light blocking portion 23 to be opposed to the pixel electrodes 34 on the array substrate 30 side. Counter electrode lines, which are not illustrated, are arranged in the non-display area of the liquid crystal panel 10. The counter electrode lines are connected to the counter electrode 24 via a contact hole. Reference potential is applied to the counter electrode 24 from the counter electrode lines and the potential to be applied to the pixel electrodes 34 is controlled by the TFTs 32 to produce potential difference between the pixel electrodes 34 and the counter electrode 24.

The configuration of the liquid crystal panel 10 of this embodiment is described above. Hereinafter, among edge surfaces of the liquid crystal panel 10, an edge surface having a linear outline (a left side edge surface in FIG. 2) is referred to as a linear edge surface, and an edge surface having a curved outline shape (an edge surface on the right side in FIG. 2) is referred to as a curved edge surface. Hereinafter, the configuration formed on the first glass substrate 20A except for the alignment film 10A is referred to as a CF layer (an example of a thin film pattern) 20L and the configuration formed on the second glass substrate 30A except for the alignment film 10B is referred to as a TFT layer (an example of a thin film pattern) 30L.

Next, a method of collectively producing the liquid crystal panels 10 having the above configuration will be described. First, the first glass substrate 20A to be the color filter 20 and the second glass substrate 30A to be the array substrate 30 are prepared. The CF layer 20L is formed on one plate surface of the first glass substrate 20A and the TFT layer 30L is formed on one plate surface of the second glass substrate 30A. The CF layer 20L and the TFT layer 30L are formed on the first glass substrate 20A and the second glass substrate 30A, respectively, with a known photolithography method. The first glass substrate 20A and the second glass substrate 30A are transferred through a film forming device, a resist coating device, and an exposure device used with the photolithography method such that thin films for the CF layer 20L and the TFT layer 30L are layered sequentially in a predefined pattern.

In the producing method according to this embodiment, a bonded substrate 50 obtained by bonding the first glass substrate 20A and the second glass substrate 30A is cut to obtain small pieces in processes described below. Thus, twenty four liquid crystal panels 10 are produced from one bonded substrate 50. The CF layer 20L is formed on each of twenty four portions of the first glass substrate 20A and the TFT layer 30L is formed on each of twenty four portions of the second glass substrate 30A (see FIG. 3). The CF layers 20L and the TFT layers 30L are formed in a matrix on the respective glass substrates 20A and 30A (four in the X-axis direction and six in the Y-axis direction in this embodiment) such that each of the CF layers 20L and each of the TFT layers 30L are opposite each other when bonding the glass substrates 20A and 30A.

Figure 3:
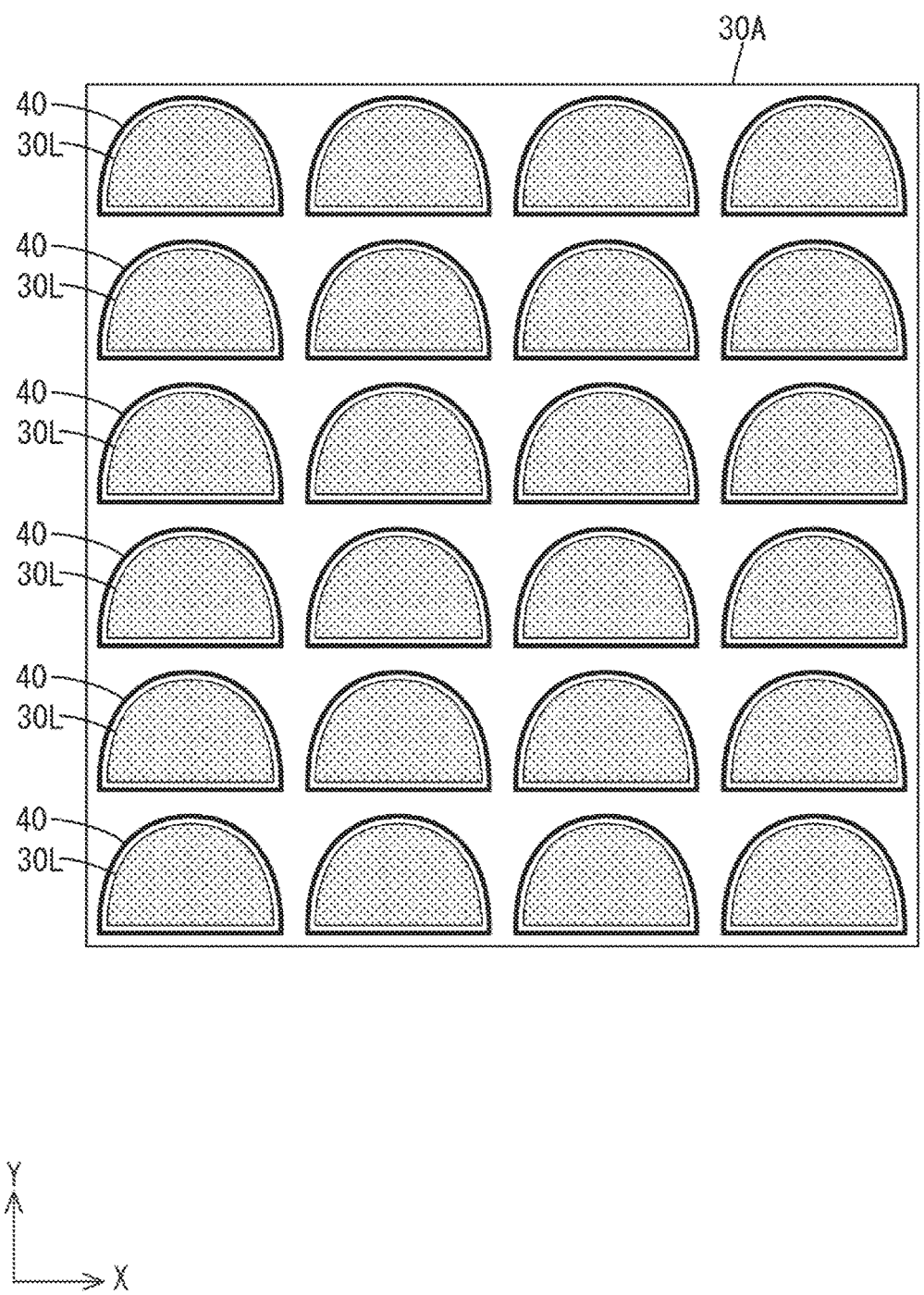
FIG. 3 is a plan view illustrating an array substrate in a bonded substrate forming process before the array substrate and a color filter substrate are bonded to each other.

Next, the alignment film 10A is disposed on the first glass substrate 20A and covers each of the CF layers 20L formed on the first glass substrate 20A, and the alignment film 10B is disposed on the second glass substrate 30A and covers each of the TFT layers 30L formed on the second glass substrate 30A. According to the above sequence, twenty four color filter substrates 20 are formed on the first glass substrate 20A and twenty four array substrates 30 are formed on the second glass substrate 30A. Next, the sealing agent portions 40 are disposed on the second glass substrate 30A to surround each of the TFT layers 30L on the second glass substrate 30A (see FIG. 3). In this process, as illustrated in FIG. 3, the sealing agent portion 40 is disposed along the outline (substantially a semicircular shape in this embodiment) of each of the liquid crystal panels 10 to be produced and disposed over a predefined width.

Figure 4:
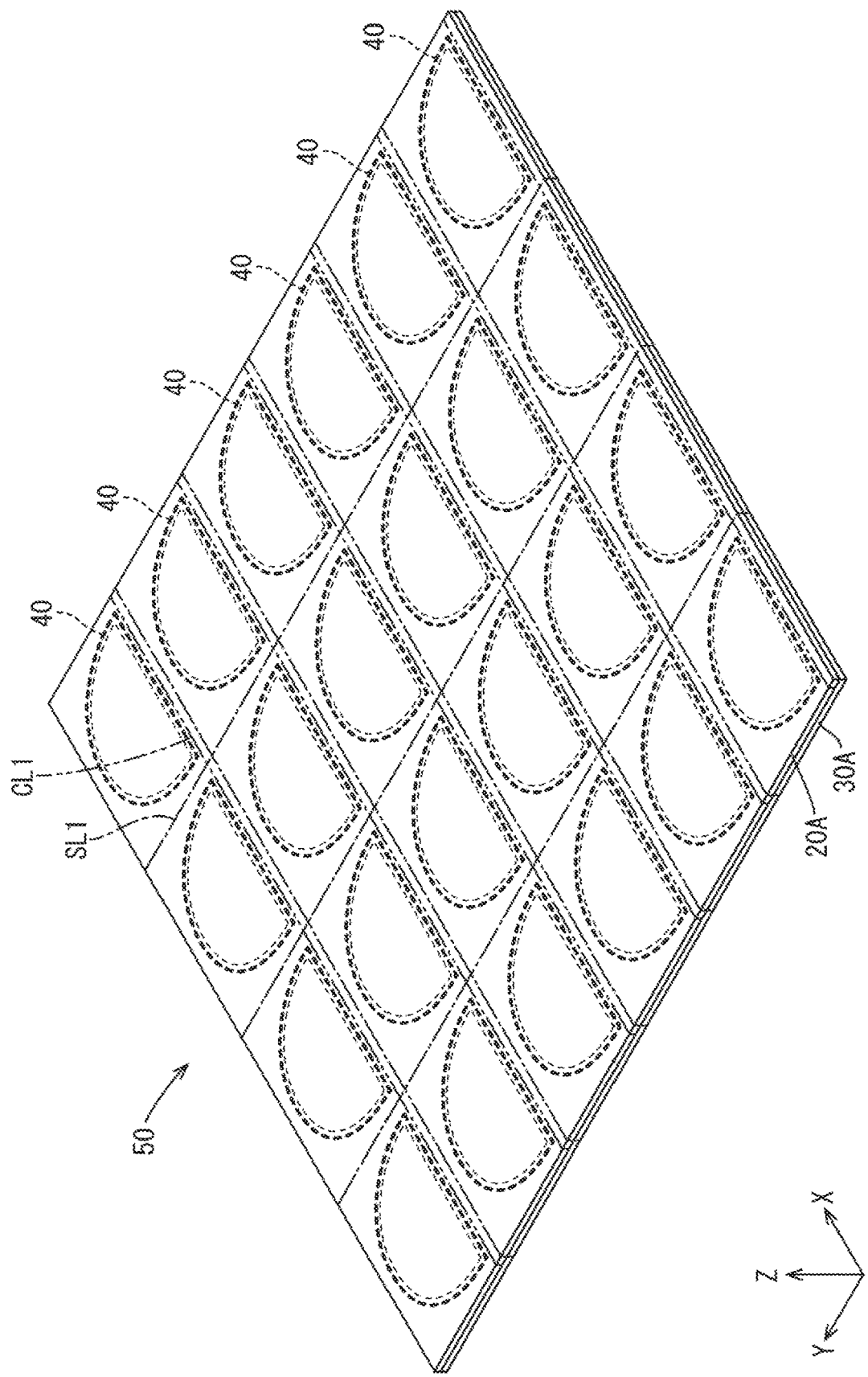
FIG. 4 is a perspective view illustrating a bonded substrate before a cutting process.

Next, the first glass substrate 20A and the second glass substrate 30A are positioned with each other such that the CF layers 20L formed on the first glass substrate 20A are opposite the TFT layers 30L formed on the second glass substrate 30A, respectively. Liquid crystals are dripped in areas surrounded by the sealing agent portions 40 on the second glass substrate 30A with the one drop fill (ODF) method using a liquid crystals dripping device. Then, the glass substrates 20A and 30A are bonded with the sealing agent portions 40 and the bonded substrate 50 is obtained as illustrated in FIG. 4 (a bonded substrate forming process). The bonding process is performed while the sealing agent portions 40 are irradiated with ultraviolet rays and heated. Accordingly, the sealing agent portions 40 are cured and the glass substrates 20A and 30A are fixed to each other with the sealing agent portions 40.

In the bonding process, by the bonding of the glass substrates 20A and 30A, the liquid crystals dripped before the bonding of the glass substrates 20A and 30A spread along a plate surface of the second glass substrate 30A and the areas surrounded by the sealing agent portions 40 are filled with the liquid crystals. Thus, the liquid crystal layers 18 are formed between the glass substrates 20A and 30A. The bonded substrate 50, which is obtained as described before, includes areas where the CF layers 20 and the TFT layers 30L that are opposite each other and each of the areas including opposing CF layer 20 and TFT layer 30L is a panel region that forms one liquid crystal panel 10. As illustrated in FIG. 4, the bonded substrate 50 is defined into twenty four panel regions. Dot-and-dash lines in FIG. 4 illustrate lines defining the panel regions on the bonded substrate 50. The cured sealing agent portion 40 and a thin film pattern (a portion inside the sealing agent portion 40 and surrounded by a thin dotted line in FIG. 4) that is arranged within the sealing agent portion 40 and includes the CF layer 20L and the TFT layer 30L are included in each panel region.

Next, one bonded substrate 50 is cut into twenty four pieces for each of the panel regions (hereinafter, each bonded substrate piece after cutting is referred to as a divided bonded substrate 50A). Specifically, in this process, the bonded substrate 50 is scribed with using a rotary blade (not illustrated) for forming scribing lines SL1 for defining the panel regions on the bonded substrate 50. Accordingly, the glass substrates 20A and 30A that are outside the sealing agent portion 40 of each panel region are cut. Further, in this process, a linear cut line CL (a two dotted line in FIG. 4) is formed in each border portion between the mounting area A3 of each liquid crystal panel 10 to be produced and other areas on the first glass substrate 20A of the bonded substrate 50. After the bonded substrate 50 is cut into twenty four pieces, a part of the first glass substrate 20A is removed from each of the divided bonded substrates 50A along each of cut lines CL1. Accordingly, the mounting area A3 of the liquid crystal panel 10 to be produced is exposed (see FIG. 5).

Figure 5:
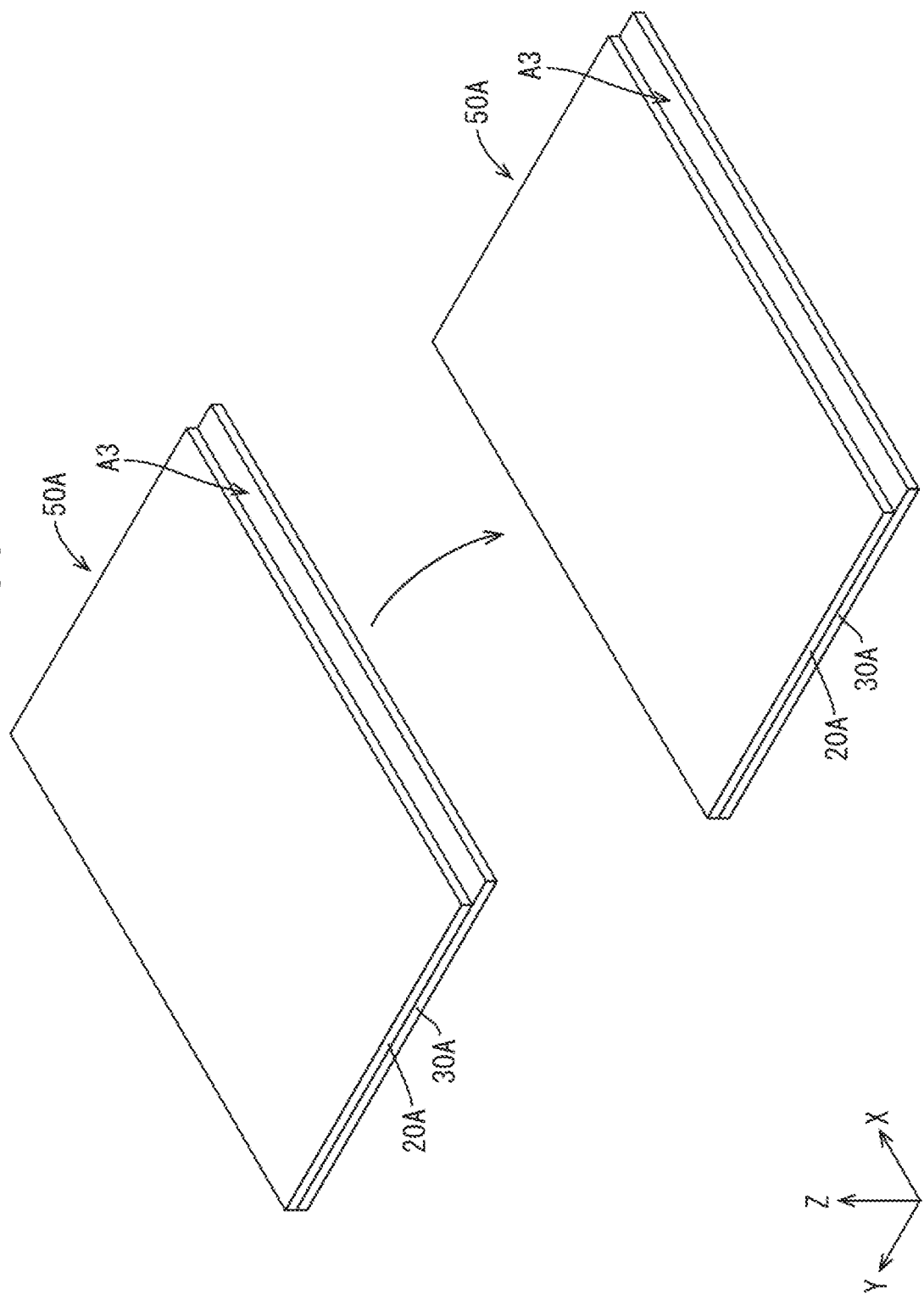
FIG. 5 is a perspective view illustrating a process of layering two separated bonded substrates.

Next, as illustrated in FIG. 5, two divided bonded substrates 50A are layered via curing resin 60 (see FIG. 6) while overlapping each other in a plan view (a layering process). In the layering process, the curing resin 60 used in the layering process is two-part liquid resin including two kinds of liquid acrylic curing resin that are to be mixed and cured. Therefore, in the layering process, a first agent and a second agent contained in the curing resin 60 are separately used. Examples of the first agent and the second agent are described as follows. The first agent of the acrylic curing resin may be resin containing 8 mass % of polyester urethane acrylate-based oligomer as a polyfunctional (meth)acrylate oligomer/polymer, 5 mass % of polypropylene glycol diacrylate as a polyfunctional (meth)acrylate monomer, 60 mass % of benzyl methacrylate and 10 mass % of phenol 2 mol (ethylene oxide-modified) (meth)acrylate as aromatic mono(meth)acrylate not having a hydroxyl group, a carboxyl group, and an epoxy group, 3 mass % of a radical photopolymerization initiator, and 3 mass % of a radical thermal polymerization initiator.

Figure 6:
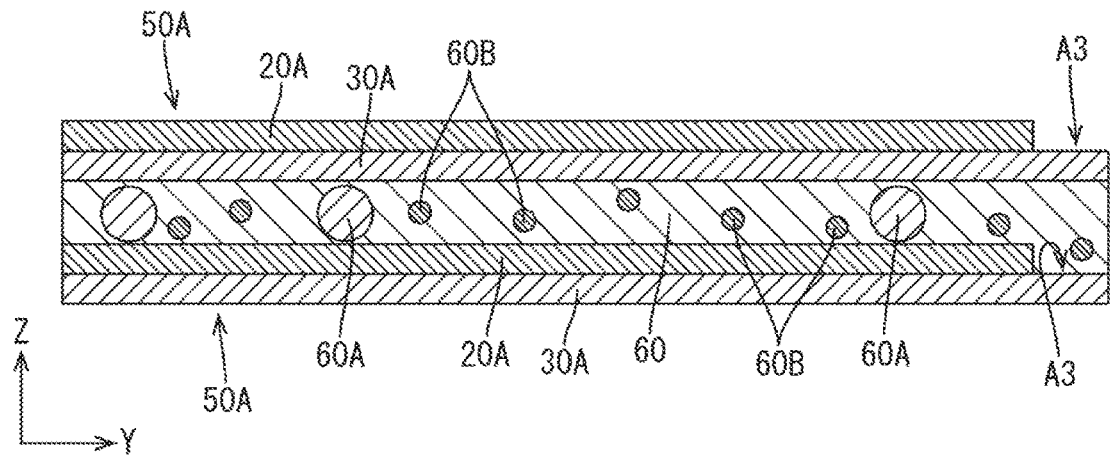
FIG. 6 is a cross-sectional view illustrating a cross-section of layered two divided bonded substrates.

The second agent of the acrylic curing resin may be resin containing 8 mass % of polyester urethane acrylate-based oligomer as a polyfunctional (meth)acrylate oligomer/polymer, 5 mass % of polypropylene glycol diacrylate as a polyfunctional (meth)acrylate monomer, 60 mass % of benzyl methacrylate and 10 mass % of phenol 2 mol (ethylene oxide-modified) (meth)acrylate as aromatic mono(meth)acrylate not having a hydroxyl group, a carboxyl group, and an epoxy group, 3 mass % of a radical thermal polymerization initiator, and 3 mass % of a polymerization accelerator. As illustrated in FIG. 6, each of the first agent and the second agent contains spacers 60A each having substantially a spherical shape and contains 10 mass % of thermally expandable microcapsules 60B that are expanded larger than the spacers 60A at the temperature of 90° C. or higher.

In the layering process, after the two divided bonded substrates 50A are layered, pressure is applied to an upper one of the divided bonded substrates 50A such that bubbles are removed from the curing resin 60 and extra resin is pushed out. Thus, a distance between the two divided bonded substrates 50A is substantially constant (see FIG. 6). Then, the two divided bonded substrates 50A are positioned with each other with using a positioning camera.

Figure 7:
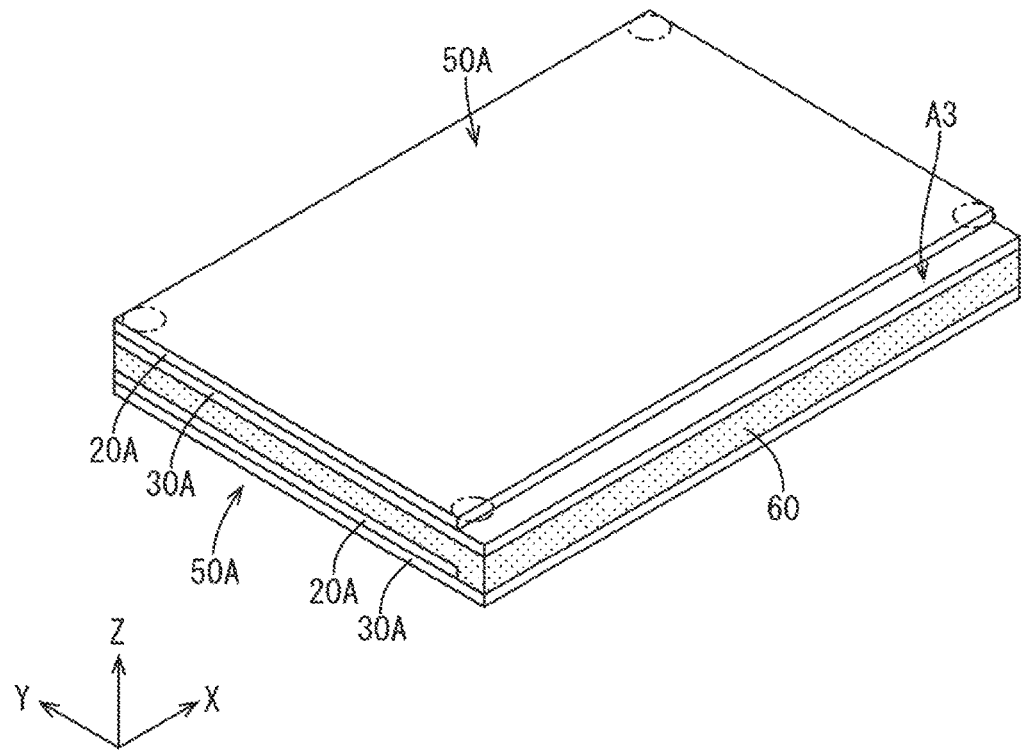
FIG. 7 is a perspective view illustrating layered two divided bonded substrates.

As illustrated in FIG. 7, in the layering process, every time another divided bonded substrate 50A is layered on the divided bonded substrate 50A, ultraviolet rays are spotlighted at four corners of the divided bonded substrates 50A in a plan view to cure the curing resin 60 at the four corners. The four corners of the layered two divided bonded substrates 50A are outside the sealing agent portions 40 that surround the respective thin film patterns. In FIG. 7, four portions surrounded by a dot-and-dash line are portions where ultraviolet rays are spotlighted. Thereafter, one divided bonded substrate 50A is layered on the layered two (multiple) divided bonded substrates 50A via the curing resin 60 and the positioning operation and curing of the curing resin 60 are performed. This sequence is repeated and six divided bonded substrates 50A are layered via the curing resin 60.

Figure 8:
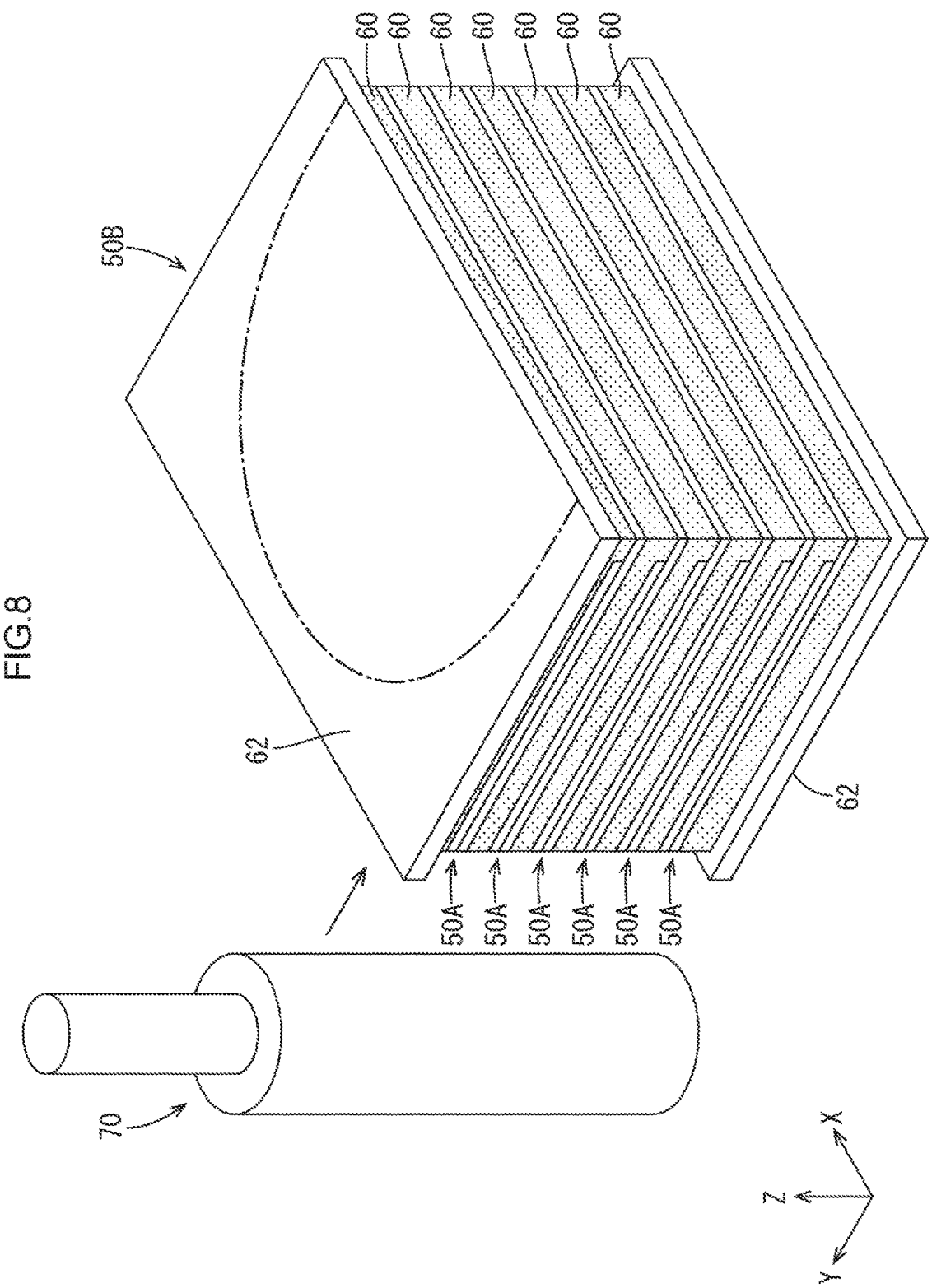
FIG. 8 is a perspective view illustrating a layered substrate.

Thereafter, as illustrated in FIG. 8, the layered six divided bonded substrates 50A are sandwiched by dummy substrates 62, which are made of glass, via the curing resin 60. Each of the dummy substrates 62 has a plate surface that is greater than a plate surface of the divided bonded substrate 50A and has a thickness greater than that of the divided bonded substrate 50A. The positioning operation of the divided bonded substrates 50A and the dummy substrates 62 with respect to the curing resin 60 and the curing operation by the ultraviolet rays at the four portions may be performed or may not be performed. In the layering process described before, during the process in which the divided bonded substrates 50A are layered, the two-part liquid acrylic curing resins of the curing resin 60 are mixed and the curing resin 60 is cured with time. Thus, the layered six divided bonded substrates 50A are fixed to each other via the curing resin 60 at the end of the layering process. In the following, the layered six divided substrates 50A and the dummy substrates 62 in a pair sandwiching the layered six divided bonded substrates 50A are referred to as a layered substrate 50B. Six liquid crystal panels 10 are produced from one layered substrate 50B.

Next, as illustrated in FIG. 8, among the edge surfaces of the layered substrate 50B, the curved edge surface of each liquid crystal panel 10 to be produced is ground with a grinder 70 (a grinding process). The grinder 70 is a device of rotating a grinding wheel for grinding an object to be processed. In the grinding process, in the divided bonded substrates 50A included in the layered substrate 50B, portions of the glass substrates 20A, 30A, the dummy substrates 62, and the curing resin 60 between the divided bonded substrates 50A that are outside the thin film patterns are collectively ground along the outline of the curved edge surface of each liquid crystal panel 10 to be produced. The linear edge surface of the liquid crystal panel 10 to be produced is not ground. A dot-and-dash line in FIG. 8 illustrates an outline of the curved edge surface of the layered substrate 50B after the grinding process. Hereinafter, the layered substrate 50B after the grinding process is referred to as a ground layered substrate 50C (see FIG. 9).

Figure 9:
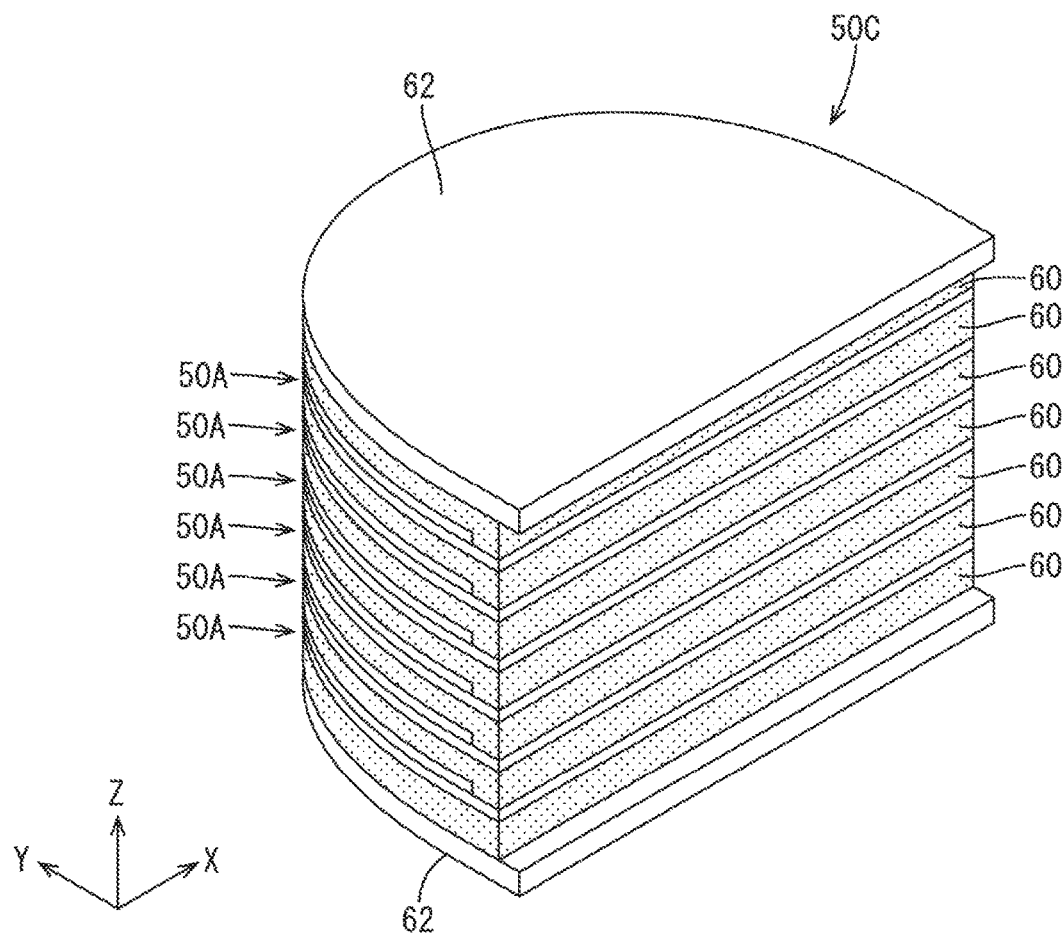
FIG. 9 is a perspective view illustrating a ground layered substrate.

In the grinding process, the curved edge surface is processed by grinding with the grinder 70 along the outline of the liquid crystal panel 10 to be produced such that the plan view outline of the processed edge surface after the grinding process is curved. Therefore, undesired cracks are less likely to be produced near the curved edge surface compared to a method with which the curved edge surface is processed with scribing. Therefore, as illustrated in FIG. 9, by performing the grinding process, the ground layered substrate 50C having the curved edge surface that is processed with high precision can be formed.

Figure 10:
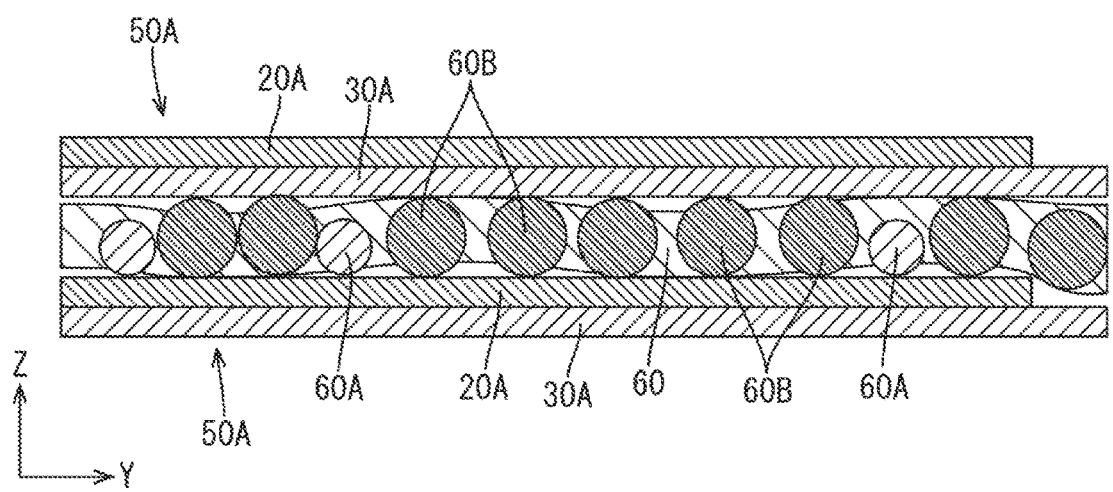
FIG. 10 is a cross-sectional view illustrating a cross-section of the ground layered substrate in a separation process.
Figure 11:
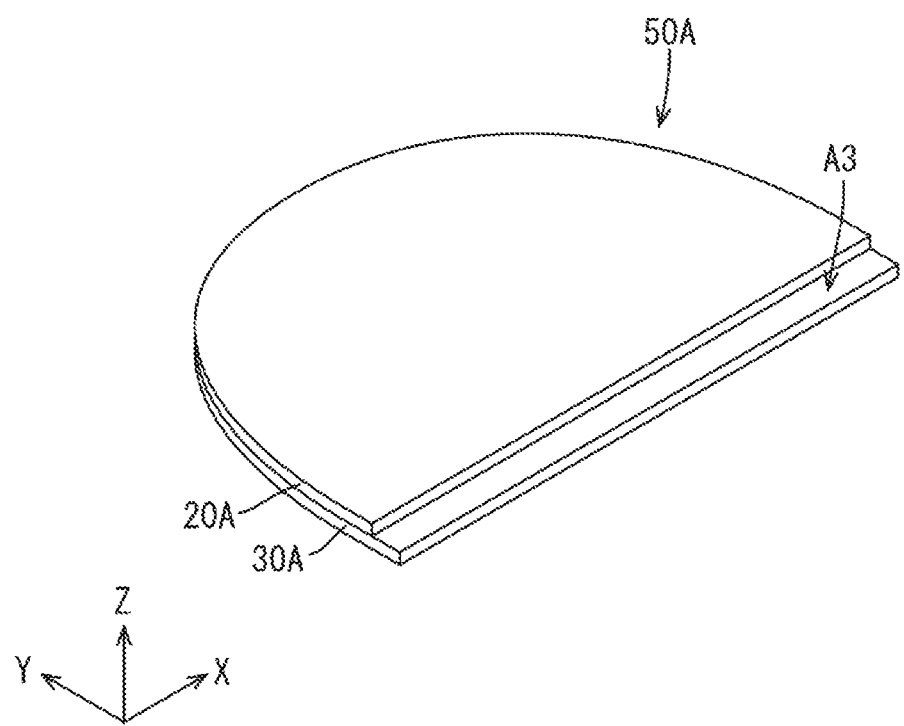
FIG. 11 is a perspective view illustrating a separated bonded substrate after the separation process.

Next, the ground layered substrate 50C is put in a furnace such as an oven and the ground layered substrate 50C is heated at a temperature ranging from 110° C. to 130° C. for a predefined time (a separation process). Accordingly, the microcapsules 60B contained in the curing resin 60 included in the ground layered substrate 50C is heated at a temperature of the above range and the microcapsules 60B are expanded greater than the spacers 60A as illustrated in FIG. 10. As a result, as illustrated in FIG. 10, in the ground layered substrate 50C, a bonding force between the curing resin 60 and the divided bonded substrates 50A is lowered and a clearance is produced therebetween. Therefore, in the ground layered substrate 50C that is taken out of the furnace after being heated for the predefined time, each of the divided bonded substrates 50A and the pair of dummy substrates 62 can be easily separated from the curing resin 60. Thereafter, the polarizing plates 10C, 10D are bonded to the outer surfaces of the glass substrates 20A, 30A of each of the divided bonded substrates 50A, which are separated from the curing resin 60, respectively (see FIG. 11). Thus, six liquid crystal panels 10 of this embodiment are obtained.

As described before, according to the method of producing the liquid crystal panels 10 of this embodiment, in the layering process, the divided bonded substrates 50A each having thin film patterns on inner surfaces thereof are layered with each other via the curing resin 60 and the curing resin 60 is cured such that the divided bonded substrates 50A that are layered on each other are fixed via the curing resin 60. In the grinding process, in the bonded divided substrates 50A that are layered on each other, the glass substrates 20A, 30A and the curing resin 60 that are outside the respective thin film patterns are collectively ground along the outline of the liquid crystal panel 10 to be produced. Thus, the curved edge surfaces of the liquid crystal panels having curved outlines are collectively formed. As a result, the process of producing the liquid crystal panels 10 is shortened compared to the method of processing the divided bonded substrates one by one to form each of the edges of the liquid crystal panels.

According to the producing method of this embodiment, the divided bonded substrates 50A that are layered on each other and fixed to each other have rigidity greater than one divided bonded substrate. Therefore, cracks are less likely to be produced on the edge surfaces of the liquid crystal panels 10 to be produced when the layered divided bonded substrates 50A are collectively ground. Further, the curved edge surfaces of the liquid crystal panels 10 having the curved outlines are formed by collectively grinding the layered divided bonded substrates 50A. Therefore, the outline of each of the liquid crystal panels 10 to be produced can be formed with high precision. According to the method of producing the liquid crystal panels 10 of this embodiment, the liquid crystal panels 10 having the curved outlines (a plan view semicircular shape in this embodiment) are collectively produced with high precision while shortening the production process.

In the producing method of this embodiment, two-part liquid resin including two kinds of liquid acrylic curing resin that are to be mixed and cured is used as the curing resin 60 in the layering process. Therefore, the curing resin 60 can be cured without applying excessive amount of light or heat to the thin film patterns formed on the bonded substrates 50. Accordingly, in each of the liquid crystal panels 10 to be produced, display errors are less likely to be caused due to the application of excessive amount of light or heat to the thin film patterns.

According to the producing method of this embodiment, in the layering process, ultraviolet rays are spotlighted at four corners of the layered two divided bonded substrates 50A in a plan view to cure the curing resin 60 at the four corners. The curing resin 60 containing a radical photopolymerization initiator that is curable by irradiation of ultraviolet rays is used. Therefore, the divided bonded substrates 50A that are layered on each other before the whole curing resin is cured are not displaced from each other.

According to the producing method of this embodiment, in the layering process, the layered substrate 50B is sandwiched by the dummy substrates 62 via the curing resin 60. Accordingly, in the grinding process, the grinder 70 is in contact with the curing resin 60 and the dummy substrates 62 sandwiching the layered substrate 50B therebetween. Therefore, in the grinding process, the stress due to the grinding is less likely to be concentrated on the uppermost one and the lowermost one of the divided bonded substrates 50A included in the layered substrate 50B, and chipping is less likely to be caused in the two divided bonded substrates 50A.

According to the producing method of this embodiment, in the layering process, the curing resin 60 containing the substantially spherical spacers 60A and thermally expandable microcapsules 60B that are expandable larger than the spacers 60A is used. Therefore, in the layering process, the clearance between the adjacent layered divided bonded substrates 50A is kept constant by the spacers 60A and the divided bonded substrates 50A are layered on each other with high precision. In the separation process, the microcapsules 60B are expanded greater than the spacers 60A by the application of heat to the curing resin 60. Therefore, each of the layered divided bonded substrates 50A is easily separated from the curing resin 60.

Modification of First Embodiment

Figure 12:
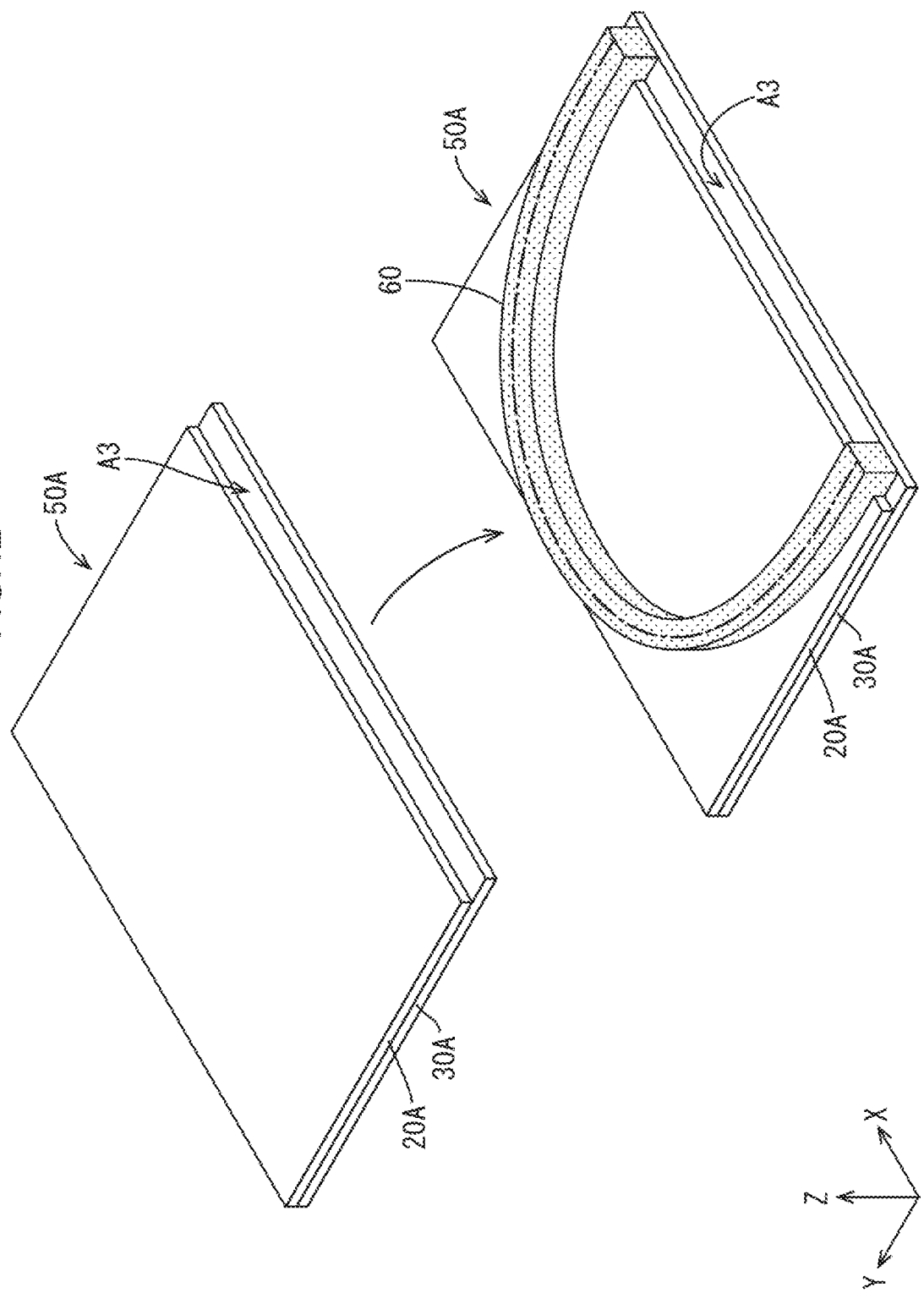
FIG. 12 is a perspective view illustrating a process of layering two divided bonded substrates according to a modification of the first embodiment.
Figure 13:
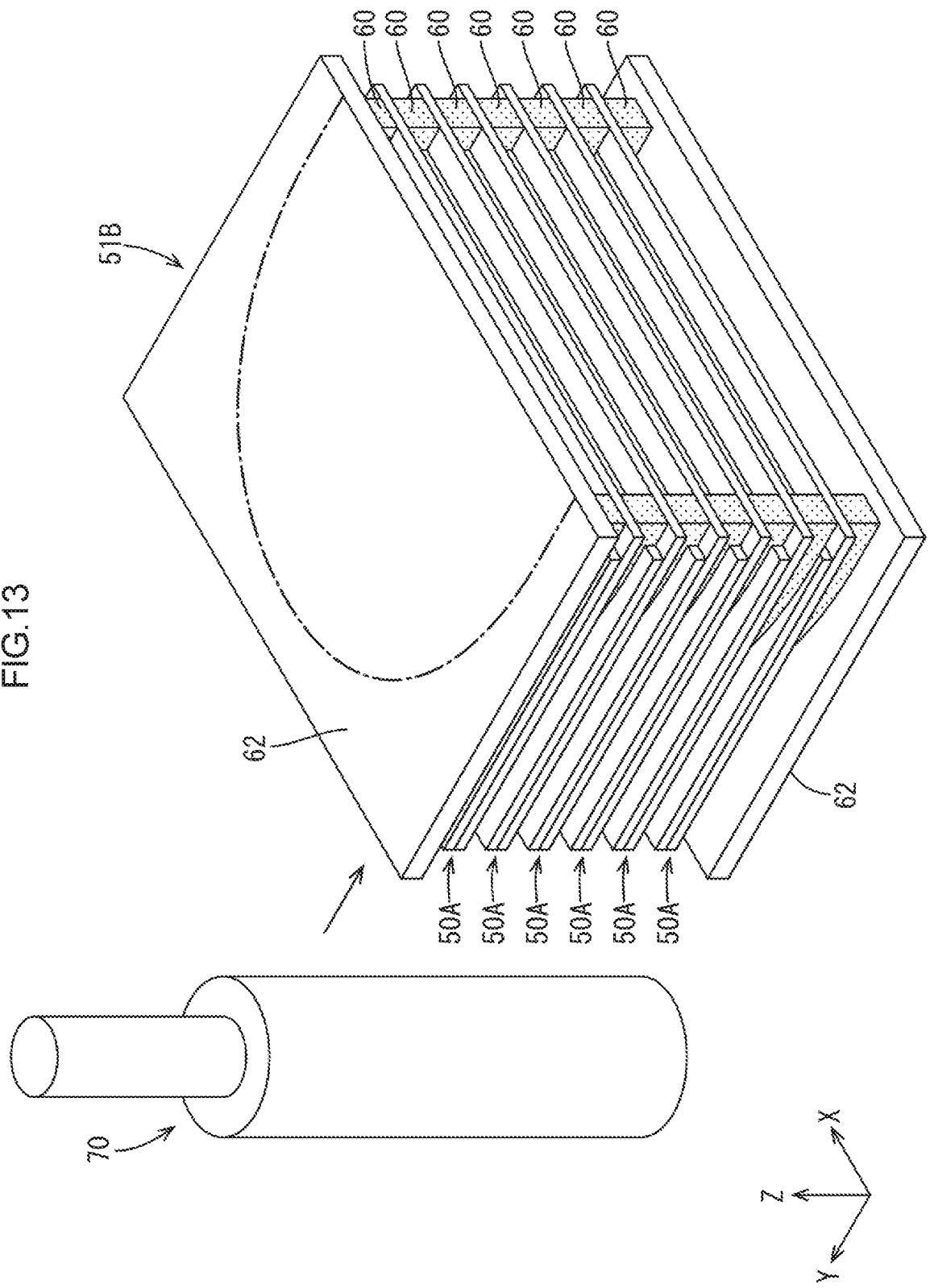
FIG. 13 is a perspective view illustrating layered two bonded substrates according to the modification of the first embodiment.
Figure 14:
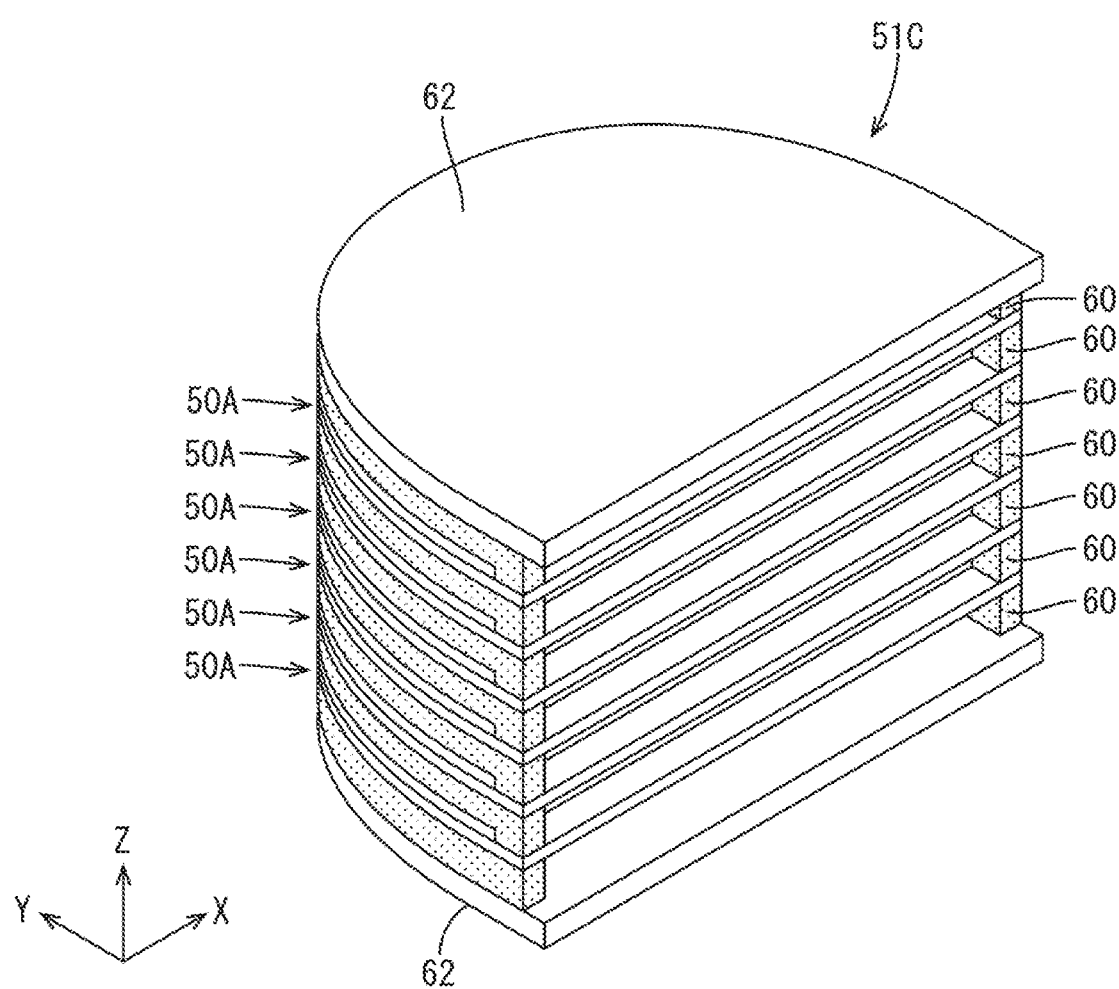
FIG. 14 is a perspective view illustrating a layered substrate according to the modification of the first embodiment.

A modification of the first embodiment will be described with reference to FIGS. 12 to 14. In this modification, the curing resin is disposed in a different way in the layering process from that in the first embodiment. According to the producing method of this modification, as illustrated in FIGS. 12 and 13, in the layering process, the curing resin 60 is disposed on only a portion near the portion of each of the divided bonded substrates 50A overlapping the outline of the curved edge surface of each liquid crystal panel 10 to be produced in a plan view, and the divided bonded substrates 50A are sequentially layered on each other via the curing resin 60 to form a layered substrate 51B. Then, the layered substrate 51B is subjected to the grinding process as is similarly to the first embodiment and a ground layered substrate 51C is formed (see FIG. 14).

According to the producing method of this modification, the amount of the curing resin 60 used in the layering process can be greatly reduced compared to the amount of the curing resin disposed on a most part of each divided bonded substrate to layer the divided bonded substrates in the layering process. As a result, a cost for the curing resin 60 is reduced. Further, due to the decrease in the amount of the curing resin 60 used in the layering process, each of the layered divided bonded substrates can be easily separated from the curing resin 60 in the separation process.

Second Embodiment

Figure 15:
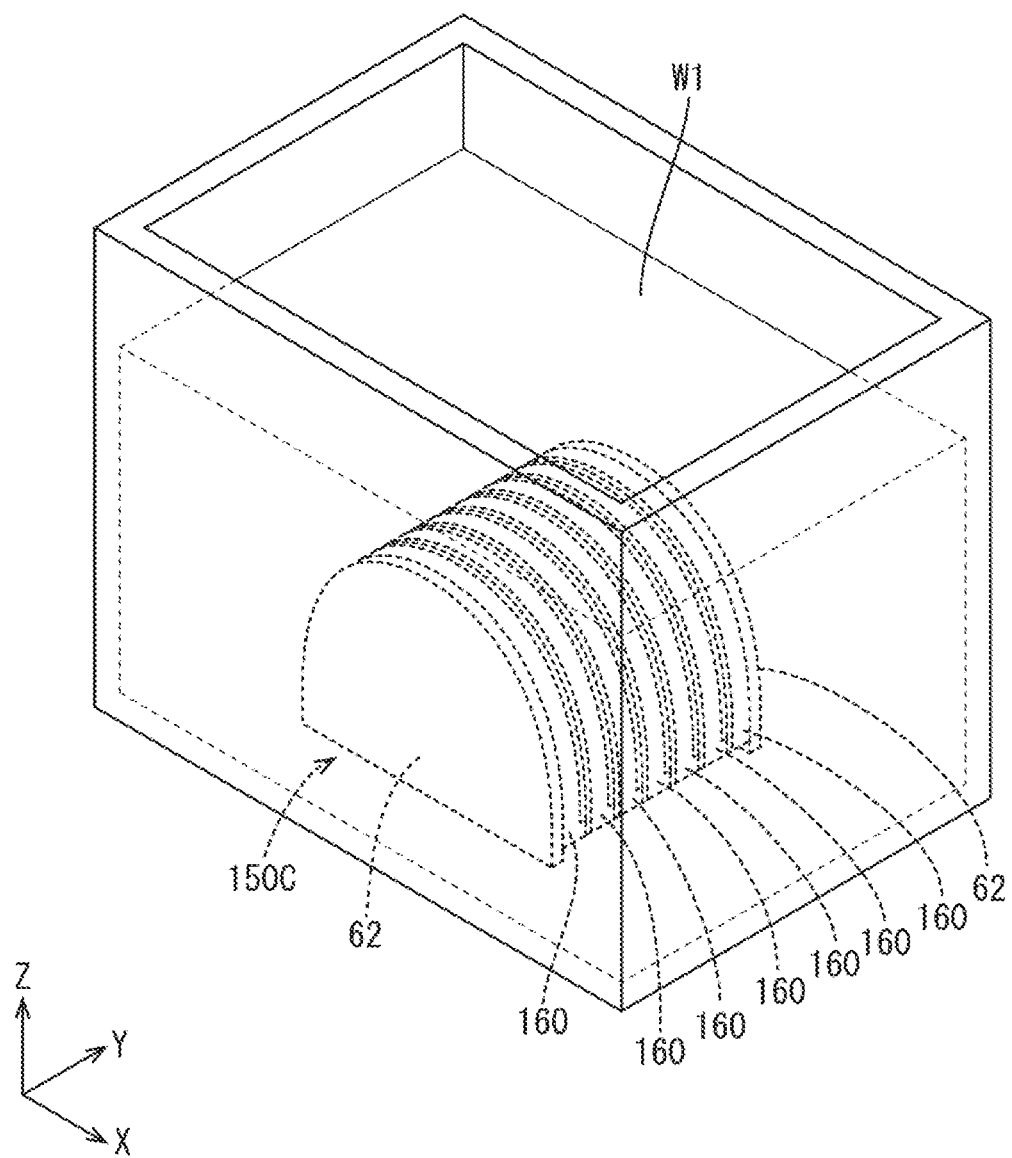
FIG. 15 is a perspective view illustrating a separation process according to a second embodiment.

A second embodiment will be described with reference to FIG. 15. According to a producing method of this embodiment, a configuration of curing resin 160 used in a layering process and a method of heating a ground layered substrate 150C in a separation process differ from those in the first embodiment. Other steps of the producing method are same as those in the first embodiment and will not be described. According to the producing method of this embodiment, in the layering process, the divided bonded substrates are layered on each other via the curing resin 160 containing 10 mass % of microcapsules that are expandable larger than the spacers at a temperature of 100° C. or lower (for example, 80° C.). In the separation process performed after the grinding process, as illustrated in FIG. 15, the ground layered substrate 150C is immersed in hot (temperature is 80° C. if the temperature at which the microcapsules are expanded at 80° C.) pure water (hereinafter, referred to as boiling water) W1 for a predefined time.

The ground layered substrate 150C is immersed in the boiling water W1 such that the microcapsules contained in the curing resin 160 included in the ground layered substrate 150C are heated at a temperature of 100° C. or higher and expanded greater than the spacers. Therefore, in the ground layered substrate 150C that is taken out from the boiling water W1 after being heated for a predetermined time, the divided bonded substrates and the dummy substrates 62 can be separated from the curing resin 160. According to the producing method of this embodiment, each of the divided bonded substrates 50A can be separated from the curing resin 160 without heating the ground layered substrate 150C at a temperature higher than 100° C. Therefore, the display errors are less likely to be generated on each liquid crystal panel 10 to be produced due to the excessive heating of the thin film patterns.

Modification of Second Embodiment

Figure 16:
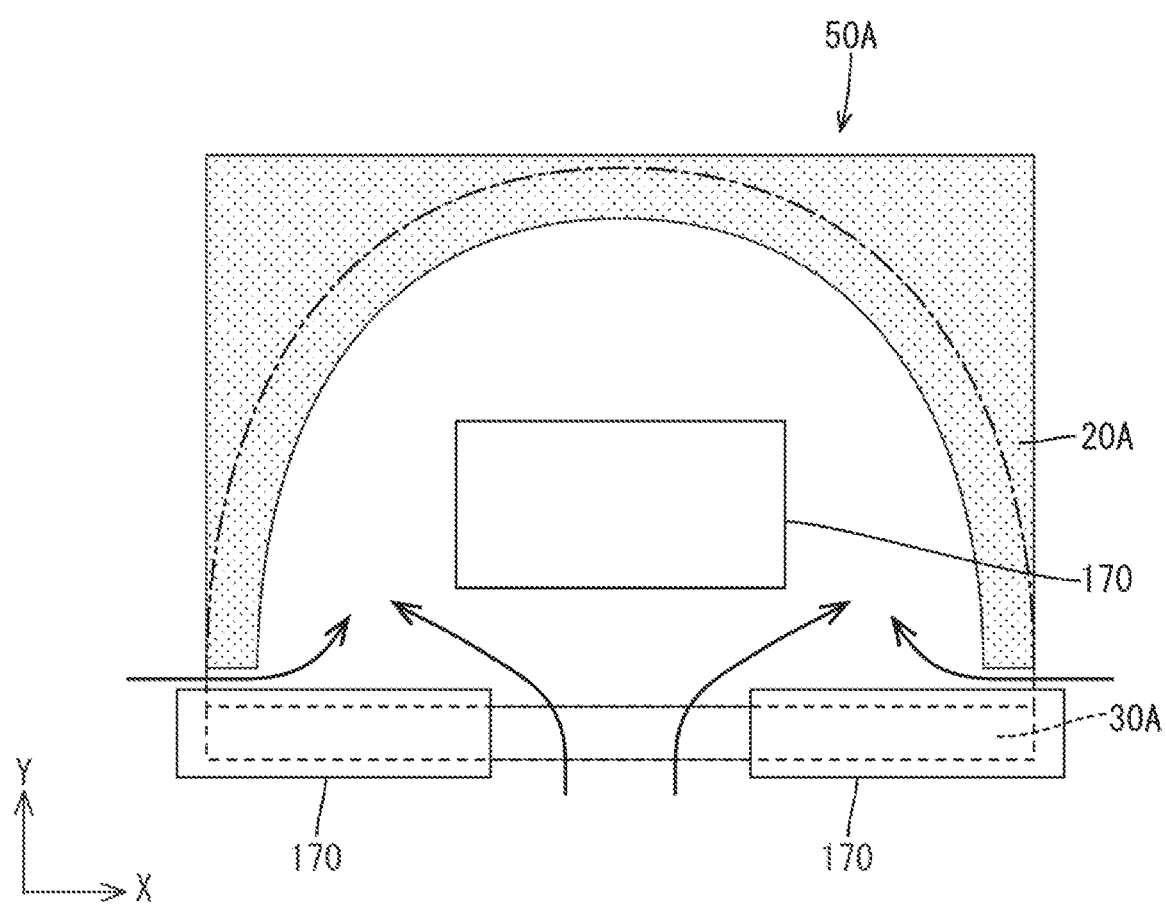
FIG. 16 is a plan view illustrating a bonded substrate forming process according to a modification of the second embodiment.

A modification of the second embodiment will be described with reference to FIG. 16. In this modification, as illustrated in FIG. 16, in the layering process, the curing resin 160 is disposed on a part of the plate surface of the divided bonded substrate 50A. Specifically, in the layering process, the curing resin 160 is disposed on only the portion of the divided bonded substrate 50A that is to be ground in the grinding process after the layering process and the portion adjacent thereto. An area filled with small dots in FIG. 16 on the plate surface of the divided bonded substrate 50A is an area where the curing resin 160 is disposed in this modification. A dot-and-dash line in FIG. 16 is an outline of a curved edge surface of the layered substrate after the grinding process. As illustrated in FIG. 16, in the layering process of this modification, sheet members 170 having a certain thickness (for example, 75 μm) are disposed on a portion of each divided bonded substrate 50A where the curing resin 160 is not disposed. A configuration of the curing resin 160 and the method of heating the ground layered substrate 50C in the separation process are similar to those in the second embodiment.

In the layering process of this modification, the curing resin 160 is disposed on a portion of the plate surface of each divided bonded substrate 50A and the sheet member 170 is disposed on another portion of the plate surface of each divided bonded substrate 50A. With such a configuration, a distance between the adjacent layered divided bonded substrates 50A is kept to the same as the thickness of the sheet member 170 and a space is formed between the adjacent layered divided bonded substrates 50A by the curing resin 160 and the sheet member 170. Therefore, in the separation process of the producing method of this modification, the boiling water is likely to flow into the space between the adjacent layered divided bonded substrates 50A when the ground layered substrate 50C is immersed in the boiling water. Accordingly, each of the divided bonded substrates 50A can be separated from the curing resin 160 more easily. Arrows in FIG. 16 represent a part of paths along which the boiling water flows into the ground layered substrate 50C that is immersed in the boiling water.

Third Embodiment

A third embodiment will be described with reference to FIG. 17. A producing method of this embodiment includes an etching process unlikely to that of the first embodiment. Other steps of the producing method are same as those in the first embodiment and will not be described. According to the producing method of this embodiment, before the separation process and after the grinding process, the ground layered substrate 50C is immersed in etching solution such as hydrofluoric acid for a short time such that a part of edge surfaces of the ground layered substrate 50C are removed with etching, as illustrated in FIG. 17 (an etching process). The edge surfaces of the ground layered substrate 50C (the divided bonded substrates 50A and the curing resin 60) are removed in the etching process by a width H1 (see FIG. 17) that is 40 μm, for example. The dummy substrates are not illustrated in FIG. 17.

According to the producing method of this embodiment including such an etching process, in the etching process, a part of the edge surfaces of the ground layered substrate 50C is removed and accordingly, microcracks that may be produced on the edge surfaces are removed together with the edge surfaces. Therefore, cracks due to the microcracks are less likely to be produced in each of the liquid crystal panels to be produced and the liquid crystal panel to be produced has greater strength.

Modifications of each of the above embodiments will be described below.

(1) In each of the above embodiments, the layered substrate is subjected to the grinding process using the grinder in the grinding process. However, the method and the device of performing the grinding process may not be limited thereto.

(2) In each of the above embodiments, the method of producing the liquid crystal panels included in the liquid crystal display device is described. However, a type of the display device including the display panel produced with the producing method of the present invention is not limited. For example, the producing method of producing an organic EL panel included in an organic EL display device is also included in the scope of the present invention.

The present invention is not limited to the embodiments, which have been described using the foregoing descriptions and the drawings. The embodiments described above are also included in the technical scope of the present invention.

EXPLANATION OF SYMBOLS

10: liquid crystal panel, 12: IC chip, 14: flexible printed circuit board, 18: liquid crystal layer, 20: color filter substrate, 20A: first glass substrate, 20L: CF layer, 22: color filter, 24: counter electrode, 30: array substrate, 30A: second glass substrate, 30L: TFT layer, 32: TFT, 34: pixel electrode, 40: sealing agent portion, 50: bonded substrate, 50A: divided bonded substrate, 50B: layered substrate, 50C, 150C: ground layered substrate, 60, 160: curing resin, 62:

dummy substrate, 170: sheet member, A1: display area, A2: non-display area, A3: mounting area, CL1: cut line, SL1: scribing line

The invention claimed is:

1. A method of collectively producing display panels each having an outline a part of which is curved, the method comprising:
   a bonded substrate forming process of bonding substrates in a pair one of which has thin film patterns and forming a bonded substrate;
   a layering process of layering multiple bonded substrates via curing resin and curing the curing resin after the bonded substrate forming process, the curing resin containing:
   (A) a polyfunctional (meth)acrylate oligomer/polymer and/or a polyfunctional (meth)acrylate monomer,
   (B) aromatic mono(meth)acrylate not having a hydroxyl group, a carboxyl group, and an epoxy group and/or alicyclic mono(meth)acrylate not having a hydroxyl group, a carboxyl group, and an epoxy group,
   (C) a radical photopolymerization initiator,
   (D) a radical thermal polymerization initiator,
   (E) a polymerization accelerator, and
   (F) thermally expandable microcapsules,
   as a first agent containing at least the radical photopolymerization initiator and a second agent containing at least the radical thermal polymerization initiator;
   a grinding process of collectively grinding the substrates in a pair and the curing resin that are outside the thin film pattern on each of the bonded substrates that are layered on each other along the outline and collectively forming edge surfaces of the display panels each having the curved outline, the grinding process being performed after the layering process; and
   a separation process of separating each of the bonded substrates that are layered on each other from the curing resin after the grinding process.

2. The method of producing the display panels according to claim 1, wherein in the layering process, the curing resin is disposed only a portion near a portion of the bonded substrate overlapping the outline in a plan view.

3. The method of producing the display panels according to claim 1, wherein in the layering process, the curing resin includes multiple types of resin that are cured by mixing.

4. The method of producing the display panels according to claim 3, wherein
   in the layering process, every time another bonded substrate is layered on the bonded substrate with using the curing resin having photo curing properties, light is spotlighted to portions of the bonded substrates that are layered on each other and the portions are outside each of the thin film patterns in a plan view and the curing resin in the portions is cured.

5. The method of producing the display panels according to claim 1, wherein
   in the layering process, dummy substrates in a pair having plate surfaces greater than that of the bonded substrate are prepared and after the bonded substrates are layered on each other, the bonded substrates that are layered are sandwiched by the dummy substrates in a pair via the curing resin.

6. The method of producing the display panels according to claim 1, wherein
   in the layering process, the curing resin containing spacers each having a spherical shape and thermally expandable microcapsules that are expandable greater than a diameter of the spacers is used, and
   in the separation process, heat is applied to the curing resin to expand the microcapsules.

7. The method of producing the display panels according to claim 6, wherein
   in the layering process, the microcapsules that are expandable at a temperature of 100° C. or lower are used, and
   in the separation process, the bonded substrates that are layered are immersed in boiling water.

8. The method of producing the display panels according to claim 7, wherein in the layering process, the curing resin is disposed on only a part of a plate surface of the bonded substrate and a sheet member having a certain thickness is disposed on another part of the plate surface.

9. The method of producing the display panels according to claim 1, further comprising:
   an etching process of removing a part of edge surfaces of the bonded substrates that are layered with etching after the grinding process and before the separation process.

* * * * *